(12) United States Patent
Funahashi et al.

(10) Patent No.: US 7,516,324 B2
(45) Date of Patent: Apr. 7, 2009

(54) INFORMATION PROCESSING SYSTEM, INFORMATION MANAGEMENT APPARATUS, AND INFORMATION PROCESSING APPARATUS

(75) Inventors: Takeshi Funahashi, Saitama (JP); Yoshihiro Tsukamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 809 days.

(21) Appl. No.: 10/189,867

(22) Filed: Jul. 3, 2002

(65) Prior Publication Data

US 2003/0023735 A1 Jan. 30, 2003

(30) Foreign Application Priority Data

Jul. 5, 2001 (JP) .............................. 2001-204745
Jul. 16, 2001 (JP) .............................. 2001-214710

(51) Int. Cl.
H04L 9/00 (2006.01)
H04K 1/00 (2006.01)
G06F 7/04 (2006.01)

(52) U.S. Cl. ..................... 713/168; 713/186; 726/30
(58) Field of Classification Search ............... 463/29; 713/168, 186; 726/30
See application file for complete search history.

(56) References Cited

U.S. PATENT DOCUMENTS

| | | | |
|---|---|---|---|
| 4,575,621 A * | 3/1986 | Dreifus ................. | 235/380 |
| 6,030,288 A * | 2/2000 | Davis et al. ............. | 463/29 |
| 6,038,666 A * | 3/2000 | Hsu et al. ............... | 713/186 |
| 6,099,408 A * | 8/2000 | Schneier et al. ......... | 463/29 |
| 6,595,855 B2 * | 7/2003 | Sako ...................... | 463/29 |
| 6,712,695 B2 * | 3/2004 | Mothwurf et al. ........ | 463/25 |
| 6,772,339 B1 * | 8/2004 | Jakobsson et al. ....... | 713/168 |
| 6,865,550 B1 * | 3/2005 | Cok ....................... | 705/51 |
| 6,887,159 B2 * | 5/2005 | Leen et al. .............. | 463/42 |
| 6,949,022 B1 * | 9/2005 | Showers et al. ......... | 463/16 |
| 2003/0054886 A1 * | 3/2003 | Lion et al. .............. | 463/42 |
| 2003/0104859 A1 * | 6/2003 | Chaum ................... | 463/22 |

* cited by examiner

*Primary Examiner*—Kambiz Zand
*Assistant Examiner*—William S Powers
(74) *Attorney, Agent, or Firm*—Frommer Lawrence & Haug LLP; William S. Frommer; Ellen Marcie Emas

(57) ABSTRACT

A system for playing a gambling game over a network. A plurality of clients are connected to a server by the network. The client personally authenticates a person using the client by analyzing a fingerprint collected by a fingerprint sensor. The client then generates elemental information in accordance with a predetermined condition. Authentication-information is generated irreversibly and univocally on the basis of the elemental information generated by the client. The server receives a plurality of pieces of the authentication information from the clients which it transmits to the clients. The client then transmits the elemental information to the server after reception of all the pieces of the authentication information.

25 Claims, 15 Drawing Sheets

FIG.5
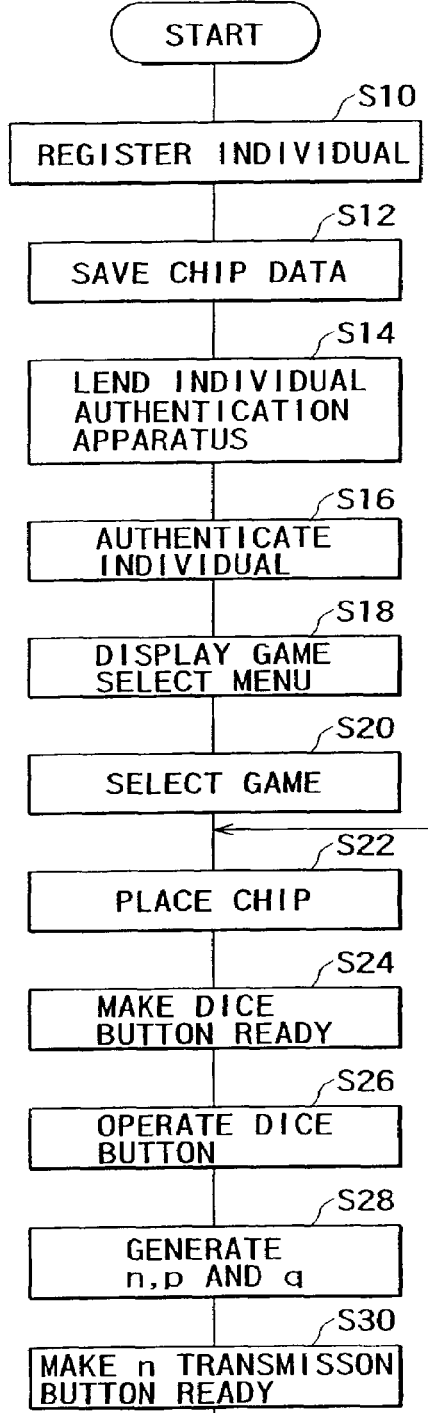
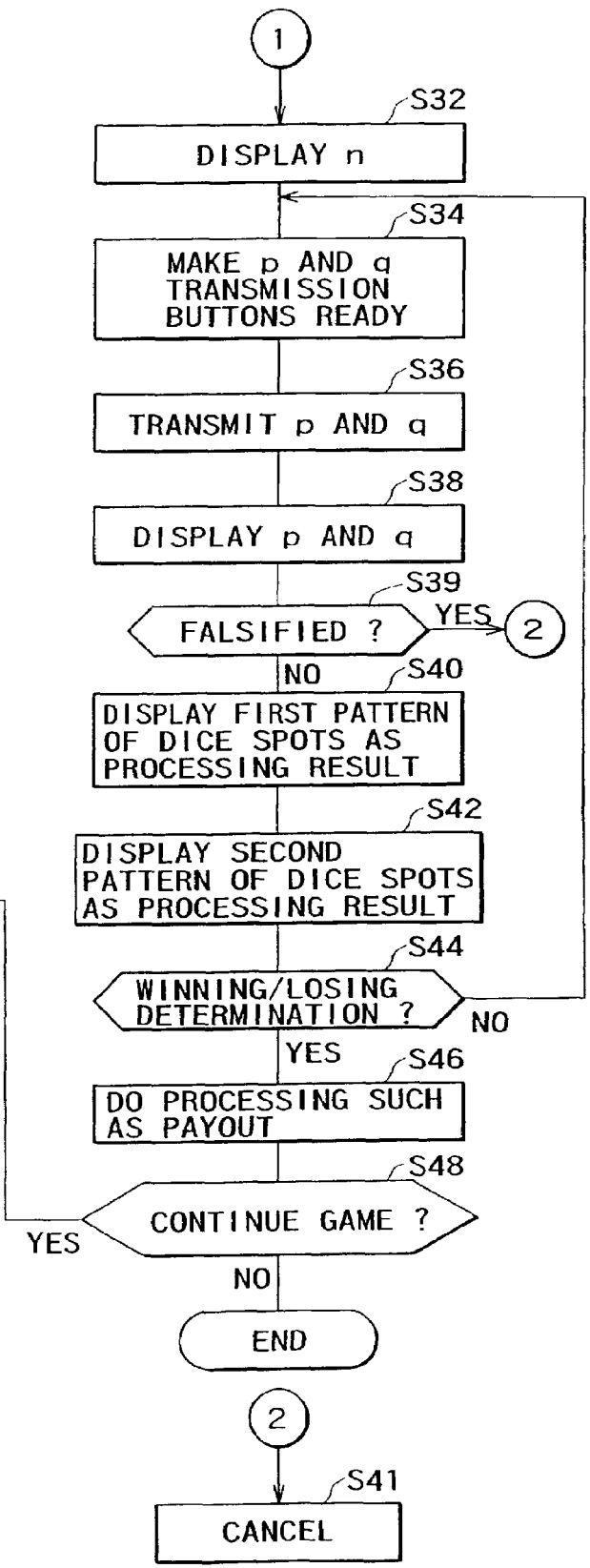

| Ua | X |
|---|---|
| Ua1 | X1 |
| Ua2 | X2 |
| Ua3 | X3 |
| ⋮ | ⋮ |

| Ub | X |
|---|---|
| Ub1 | X1 |
| Ub2 | X2 |
| Ub3 | X3 |
| ⋮ | ⋮ |

| Vb | Ub |
|---|---|
| Vb1 | Ub1 |
| Vb2 | Ub2 |
| Vb3 | Ub3 |
| ⋮ | ⋮ |

| Va | Ua |
|---|---|
| Va1 | Ua1 |
| Va2 | Ua2 |
| Va3 | Ua3 |
| ⋮ | ⋮ |

| Va | Vb |
|---|---|
| Va7 | Vb1 |
| Va18 | Vb3 |
| Va1 | Vb7 |
| ⋮ | ⋮ |

INFORMATION PROCESSING SYSTEM, INFORMATION MANAGEMENT APPARATUS, AND INFORMATION PROCESSING APPARATUS

BACKGROUND OF THE INVENTION

The present invention relates to an information-processing system, an information management apparatus, and an information-processing apparatus. In particular, the present invention relates to a communication game system, a communication game method and a program thereof.

In a system connecting a plurality of clients to a server through the Internet, a technology for playing a game between the clients and the server has already been put to practical use. It is expected that there will be introduced gambling using such a system in the near future.

By the way, in the system for playing a game through the Internet, players present at places separated away from each other play a game. Thus, in a process to exchange information through the Internet, there are chances to do a cheating such as falsification of data.

SUMMARY OF THE INVENTION

It is thus an object of the present invention addressing the problem described above to provide an information-processing system, an information management apparatus, and an information-processing apparatus that are capable of preventing players from doing a cheating and are advantageous for playing a game as a kind of gambling.

To achieve the above object, according to a first aspect of the present invention, there is provided an information-processing system comprising a plurality of information-processing apparatus and an information management apparatus connected to the information-processing apparatus by a communication network wherein:

the information-processing apparatus comprises:

an elemental-information-generating means for generating elemental information in accordance with a predetermined condition; and an authentication-information-generating means for irreversibly and univocally generating authentication-information on the basis of the elemental information generated by the elemental-information-generating means, the information management apparatus comprises:

an authentication-information-receiving means for receiving a plurality of pieces of the authentication information from the information-processing apparatus; and an authentication-information-transmitting means for transmitting the pieces of the authentication information received by the authentication-information-receiving means to the information-processing apparatus, and the information-processing apparatus further has an elemental-information-transmitting means for transmitting the elemental information generated by the elemental-information-generating means to the information management apparatus after reception of all the pieces of the authentication information from the information management apparatus.

With this configuration of the information-processing system, each of the information-processing apparatus transmits the elemental information to the information management apparatus after reception of the authentication information from the information management apparatus. Thus, if the elemental information is falsified for example during transmission through the communication network or in the information management apparatus, the information-processing apparatus is capable of pointing out a cheating of the falsification by using the received authentication information. In addition, if any one of the information-processing apparatus modifies elemental information transmitted by itself, a cheating of the modification can be pointed out by using information transmitted by the other ones of the information-processing apparatus as a base. Thus, it is not necessary for the information-processing apparatus to transmit elemental information at the same time to the information management apparatus. That is to say, the information-processing apparatus are allowed to transmit elemental information at different times to the information management apparatus.

According to a second aspect of the present invention, there is provided an information management apparatus connected to a plurality of information-processing apparatus by a communication network, the information management apparatus comprising:

an authentication-information-receiving means for receiving a plurality of pieces of authentication information irreversibly and univocally generated by the information-processing apparatus on the basis of elemental information generated also by the information-processing apparatus from the information-processing apparatus;

an authentication-information-transmitting means for transmitting the pieces of the authentication information received by the authentication-information-receiving means to the information-processing apparatus, and an elemental-information-receiving means for receiving the elemental information generated by the information-processing apparatus after transmission of the pieces of the authentication information by the authentication-information-transmitting means.

The information management apparatus may further have a judgment means for forming a judgment as to whether or not the elemental information received by the elemental-information-receiving means has been changed on the basis of the authentication information received by the authentication-information-receiving means.

The elemental information may be a plurality of prime numbers and the authentication information is a product of the prime numbers.

The authentication information may be hash data of the elemental information.

The information management apparatus may further have a composite-information-generating means for generating a piece of composite information or a plurality of pieces of composite information on the basis of said elemental information received by said elemental-information-receiving means.

With these configurations of the information management apparatus, since the elemental information is a plurality of prime numbers and the authentication information is a product of the prime numbers, for a piece of authentication information, there is only one set of pieces of elemental information. For example, the elemental information consists of 2 prime numbers and the authentication information is a product of the 2 prime numbers. Thus, if any one of the prime numbers composing the elemental information is falsified, the authentication information representing the product of the prime numbers will also have a different value. As a result, a cheating of the falsification can be pointed out. As an alternative, the authentication information may also be derived as hash data of the elemental information.

According to a third aspect of the present invention, there is provided an information-processing apparatus connected to an information management apparatus by a communication network for connecting the information management apparatus to a plurality of the information-processing apparatus, the information-processing apparatus comprising:

an elemental-information-generating means for generating elemental information in accordance with a predetermined condition;

an authentication-information-generating means for irreversibly and univocally generating authentication-information on the basis of the elemental information generated by the elemental-information-generating means; and an elemental-information-transmitting means for transmitting the elemental information generated by the elemental-information-generating means to the information management apparatus after reception of all the pieces of the authentication information, which are associated with pieces of elemental information generated by the other ones of the info-processing apparatus, from the information management apparatus.

The information-processing apparatus may further have an elemental-information-receiving means for receiving the elemental information generated by the other ones of the information-processing apparatus from the other information-processing apparatus; and a judgment means for forming a judgment as to whether or not the elemental information received by the elemental-information-receiving means has been changed on the basis of the authentication information generated by the authentication-information-generating means.

The elemental-information-generating means may generate a plurality of prime numbers as the elemental information; and the authentication-information-generating means may generate a composite number equal to a product of the prime numbers generated by the elemental-information-generating means as the authentication information.

In the information-processing apparatus, preferably, information is exchanged with the information management apparatus, which exchanges information with the information-processing apparatuses, by adopting a public-key encryption technique; and the elemental-information-generating means generates the prime numbers in a process of generating a public key and a secret key by adoption of the public-key encryption technique.

The information-processing apparatus may further have an authentication unit for personally authenticating a person operating the information-processing apparatus wherein the authentication unit generates the public and secret keys.

The elemental-information-transmitting means may transmit the elemental information generated by the elemental-information-generating means to the information management apparatus after all the pieces of the authentication information for all pieces of the elemental information generated by the other ones of the information-processing apparatus are received from the information management apparatus.

The authentication-information-generating means may generate hash data of the elemental information as the authentication information.

With these configurations of the information-processing apparatus, each of the information-processing apparatus transmits the elemental information to the information management apparatus after reception of the authentication information from the information management apparatus. Thus, if the elemental information is falsified for example during transmission through the communication network or in the information management apparatus, the information-processing apparatus is capable of pointing out a cheating of the falsification by using the received authentication information.

In addition, if any one of the information-processing apparatus modifies elemental information transmitted by itself, a cheating of the modification can be pointed out by using information transmitted by the other ones of the information-processing apparatus as a base. Thus, it is not necessary for the information-processing apparatus to transmit elemental information at the same time to the information management apparatus. That is to say, the information-processing apparatus are allowed to transmit elemental information at different times to the information management apparatus.

According to a fourth aspect of the present invention, there is provided an information-processing method adopted in an information-processing system comprising an information management apparatus connected to a plurality information-processing apparatus by a communication network, the information-processing method comprising:

an elemental-information-generating step of generating elemental information in the information-processing apparatus in accordance with a predetermined condition; and an authentication-information-generating step of irreversibly and univocally generating authentication-information in the information-processing apparatus on the basis of the elemental information generated at the elemental-information-generating step, an authentication-information-receiving step of receiving a plurality of pieces of the authentication information in the information management apparatus from the information-processing apparatus; and an authentication-information-transmitting step of transmitting the pieces of the authentication information received at the authentication-information-receiving step from the information-management apparatus to the information-processing apparatus, an elemental-information-transmitting step of transmitting the elemental information generated at the elemental-information-generating step from the information-processing apparatus to the information management apparatus after reception of all the pieces of the authentication information by the information-processing apparatus from the information management apparatus.

With this configuration of an information-processing method, each of the information-processing apparatus transmits the elemental information to the information management apparatus after reception of the authentication information from the information management apparatus. Thus, if the elemental information is falsified for example during transmission through the communication network or in the information management apparatus, the information-processing apparatus is capable of pointing out a cheating of the falsification by using the received authentication information. In addition, if any one of the information-processing apparatus modifies elemental information transmitted by itself, a cheating of the modification can be pointed out by using information transmitted by the other ones of the information-processing apparatus as a base. Thus, it is not necessary for the information-processing apparatus to transmit elemental information at the same time to the information management apparatus. That is to say, the information-processing apparatus are allowed to transmit elemental information at different times to the information management apparatus.

According to a fifth aspect of the present invention, there is provided an information management method adopted in an information management apparatus connected to a plurality of information-processing apparatus by a communication network, the information management method comprising:

an authentication-information-receiving step of receiving a plurality of pieces of authentication information irreversibly and univocally generated by the information-processing apparatus on the basis of elemental information generated also by the information-processing apparatus from the information-processing apparatus;

an authentication-information-transmitting step of transmitting the pieces of the authentication information received at the authentication-information-receiving step to the information-processing apparatus, and an elemental-information-receiving step of receiving the elemental information generated by the information-processing apparatus after transmission of the pieces of the authentication information at the authentication-information-transmitting step.

With this configuration of the information management method, since the elemental information is a plurality of prime numbers and the authentication information is a product of the prime numbers, for a piece of authentication information, there is only one set of pieces of elemental information. For example, the elemental information consists of 2 prime numbers and the authentication information is a product of the 2 prime numbers. Thus, if any one of the prime numbers composing the elemental information is falsified, the authentication information representing the product of the prime numbers will also have a different value. As a result, a cheating of the falsification can be pointed out.

According to a sixth aspect of the present invention, there is provided an information-processing method adopted in an information-processing apparatus connected to an information management apparatus by a communication network for connecting the information management apparatus to a plurality of the information-processing apparatus, the information-processing method comprising:

an elemental-information-generating step of generating elemental information in accordance with a predetermined condition;

an authentication-information-generating step of irreversibly and univocally generating authentication-information on the basis of the elemental information generated at the elemental-information-generating step; and an elemental-information-transmitting step of transmitting the elemental information generated at the elemental-information-generating step to the information management apparatus after reception of all the pieces of the authentication information, which are associated with pieces of elemental information generated by the other ones of the info-processing apparatus, from the information management apparatus.

With this configuration of the information-processing method, each of the information-processing apparatus transmits the elemental information to the information management apparatus after reception of the authentication information from the information management apparatus. Thus, if the elemental information is falsified for example during transmission through the communication network or in the information management apparatus, the information-processing apparatus is capable of pointing out a cheating of the falsification by using the received authentication information. In addition, if any one of the information-processing apparatus modifies elemental information transmitted by itself, a cheating of the modification can be pointed out by using information transmitted by the other ones of the information-processing apparatus as a base. Thus, it is not necessary for the information-processing apparatus to transmit elemental information at the same time to the information management apparatus. That is to say, the information-processing apparatus are allowed to transmit elemental information at different times to the information management apparatus.

According to a seventh aspect of the present invention, there is provided an information-processing program to be executed by a computer for controlling an information-processing apparatus connected to an information management apparatus by a communication network for connecting the information management apparatus to a plurality of the information-processing apparatus, the information-processing program comprising:

an elemental-information-generating step of generating elemental information in accordance with a predetermined condition;

an authentication-information-generating step of irreversibly and univocally generating authentication-information on the basis of the elemental information generated at the elemental-information-generating step; and an elemental-information-transmitting step of transmitting the elemental information generated at the elemental-information-generating step to the information management apparatus after reception of all the pieces of the authentication information, which are associated with pieces of elemental information generated by the other ones of the info-processing apparatus, from the information management apparatus.

With this configuration of the information-processing program, each of the information-processing apparatus transmits the elemental information to the information management apparatus after reception of the authentication information from the information management apparatus. Thus, if the elemental information is falsified for example during transmission through the communication network or in the information management apparatus, the information-processing apparatus is capable of pointing out a cheating of the falsification by using the received authentication information. In addition, if any one of the information-processing apparatus modifies elemental information transmitted by itself, a cheating of the modification can be pointed out by using information transmitted by the other ones of the information-processing apparatus as a base. Thus, it is not necessary for the information-processing apparatus to transmit elemental information at the same time to the information management apparatus. That is to say, the information-processing apparatus are allowed to transmit elemental information at different times to the information management apparatus.

To achieve the above object, according to a first specific aspect of the present invention, there is provided a communication game system, which comprises a server and a plurality of clients connected to the server by a communication network and is used for exchanging information among the server and the clients, wherein:

the server has a server communication means for carrying out communications through the communication network, a game means for implementing a game and a server control means;

each of the clients has a display means for displaying information, a client communication means for carrying out communications through the communication network, a game-data generation means and a client control means;

the game means employed in the server implements a game by using game data received by the server communication means employed in the server from the client communication means employed in each of the clients;

the game-data generation means employed in each of the clients generates a first prime number, a second prime number and a composite number, which is a non-prime number obtained as a product of the first and second prime numbers;

the client communication means employed in each of the clients transmits the composite number to the server communication means employed in the server;

the server control means employed in the server controls the server communication means employed in the server to transmit back all the composite numbers received by the server communication means from all the client communication means employed in all the clients to the client communication means employed in each of the clients after receiving the composite numbers from all the clients; and the client control means employed in each of the clients controls the display means employed in the client to display all the composite numbers received by the client communication means employed in the client from the server communication means employed in the server and controls the client communication means to transmit the first and second prime numbers to the server communication means employed in the server after receiving all the composite numbers from all the server and displaying all the composite numbers.

According to a specific second aspect of the present invention, there is provided a server connected to a plurality of clients by a communication network, the server comprising a server communication means for carrying out communications through the communication network, a game means for implementing a game and a server control means wherein:

the game means implements the game by using game data received by the server communication means from each of the clients;

the server communication means receives a first prime number, a second prime number and a composite number, which are generated by each of the clients, from each of the clients, where the composite number is a nonprime number obtained as a product of the first and second prime numbers;

the server control means controls the server communication means to transmit back all the composite numbers received by the server communication means from all the clients to each of the clients after receiving the composite numbers from all the clients; and the server control means controls the server communication means to transmit back all the first and second prime numbers received by the server communication means from all the clients to each of the clients as game data after each of the clients displays all the composite numbers received from the server.

The server control means may control the server communication means to transmit back all the first and second prime numbers received by the server communication means from all the clients to each of the clients to be displayed in each of the clients.

The game means may carry forward the game as each of the clients submits stakes data representing stakes to the server by presenting the stakes data; each of the clients may transmit stakes data representing stakes to the server by presenting the stakes data at least prior to the game's execution based on both the first and second prime numbers received by the server as game data; and the server may process the stakes data on the basis of a result of the game.

The game means may carry out the game by execution of processing based on all pieces of the game data received from the clients.

According to a specific third aspect, there is provided a client connected to a server by a communication network, the client comprising a display means for displaying information, a client communication means for carrying out communications through the communication network, a game-data generation means and a client control means, wherein:

the game-data generation means generates a first prime number, a second prime number and a composite number, which is a non-prime number obtained as a product of the first and second prime numbers;

the client communication means transmits the composite number to the server;

the server receives all composite numbers from all clients connected to the server and transmits back all the composite numbers to each of the clients connected to the server; and the client control means controls the display means to display all the composite numbers transmitted back by the server and received by the client communication means, and controls the client communication means to transmit the first and second prime numbers to the server after receiving all the composite numbers from the server and displaying all the composite numbers.

The client may exchange information with a plurality of the server by adoption of a public-key encryption technique; the game-data generation means employed in each of the client may have a key generation means for generating a public key and a secret key by adoption of the public-key encryption technique; and the game-data generation means may generate the first and second prime numbers in a process carried out by the key generation means of the client to generate the public and secret keys.

The client control means may compare each of the composite numbers received by the client communication means with the composite number's associated first and second prime numbers received by the client communication means to form a judgment as to whether or not the first and/or second prime numbers have been falsified.

According to a specific fourth aspect of the present invention, there is provided a method adopted by a server connected to a plurality of clients via a communication network, comprising:

a server communication step of receiving a composite number, which is a non-prime number obtained as a product of first and second prime numbers having been generated by each of the clients, from the client;

a server control step of transmitting, when receiving all of the composite numbers from each of the clients in the server communication step, transmitting back all of the composite numbers to the client; and a game implementing step of implementing game by using game data supplied from each of the clients in the server communication step;

wherein in the server communication step, after all of the composite numbers received by each of the clients are displayed on the client, all of the first and second prime numbers transmitted from the client are received as the game data.

According to a specific fifth aspect of the present invention, there is provided a program to be executed by a server connected to a plurality of clients by a communication network, the program comprising:

a tenth step of receiving a composite number from each of the clients where the composite number is a nonprime number obtained as a product of a first prime number and a second prime number, which are generated by the client;

an eleventh step of transmitting all the composite numbers received from all the clients at the tenth step to each of the clients after receiving all the composite numbers from all the clients at the tenth step;

a twelfth step of requesting each of the clients that both the first prime number and the second prime number be transmitted to the server as game data after each of the clients displays all the composite numbers received from the server at the eleventh step; and a thirteenth step of executing a game by using the game data received from the clients.

According to a specific sixth aspect of the present invention, there is provided a program to be executed by a client connected to a server by a communication network, the program comprising:

a twentieth step of generating a first prime number, a second prime number and a composite number, which is a non-prime number obtained as a product of the first and second prime number;

a twenty-first step of transmitting the composite number generated at the twentieth step to the server;

a twenty-second step of displaying all composite numbers received from the server on a display means of the client where the composite numbers are composite numbers received by the server from the client and all other clients also connected to the server and transmitted by the server to the client and to each the all other clients after reception of all the composite numbers from the client and the all other clients at the twenty-first step; and a twenty-third step of transmitting the first and second prime numbers to the server as game data after execution of the twenty-second step.

With these configurations, after all the composite numbers are displayed on each of the clients, each of the clients transmits both a first prime number and a second prime number to the server as game data. Thus, if the first prime number and/or the second prime number are subjected to a cheating such as falsification, there will be a contradictory relation among the first prime number, the second prime number and one of the composite numbers, which is associated with the first and second prime numbers. As a result, the cheating can be pointed out.

According to a specific seventh aspect of the present invention, there is provided a communication game system, which comprises a server and a plurality of clients connected to the server by a communication network and is used for exchanging information among the server and the clients, wherein:

the server has a server communication means for carrying out communications through the communication network, a game means for implementing a game and a server control means;

each of the clients has a display means for displaying information, a client communication means for carrying out communications through the communication network, a random-number generation means for generating a random number, a hash-data generation means for generating hash data of the random number, a game-data generation means for generating pieces of game data, which are each the random number's fixed-length portions obtained as a result of fragmentation of the random number into fractions having equal bit counts, and a client control means;

the game means employed in the server implements a game by using the game data received by the server communication means employed in the server from the client communication means employed in each of the clients;

the client communication means employed in each of the clients transmits the hash data to the server communication means employed in the server;

the server control means employed in the server controls the server communication means employed in the server to transmit back all pieces of hash data received by the server communication means from all the client communication means employed in all the clients to the client communication means employed in each of the clients after receiving all the pieces of hash data from all the clients; and the client control means employed in each of the clients controls the display means employed in the client to display all the pieces of hash data received by the client communication means employed in the client from the server communication means employed in the server and controls the client communication means to transmit the game data to the server communication means employed in the server after receiving all the pieces of hash data from all the server and displaying all the pieces of hash data.

According to a specific eighth aspect of the present invention, there is provided a server connected to a plurality of clients by a communication network, the server comprising a server communication means for carrying out communications through the communication network, a game means for implementing a game and a server control means wherein:

the game means implements the game by using game data received by the server communication means from each of the clients;

the server control means controls the server communication means to receive a piece of hash data, which is generated by each of the clients, from each of the clients, where the piece of hash data is hash data of a random number generated by the client;

the server control means controls the server communication means to transmit back and display all the pieces of hash data received by the server communication means from all the clients to each of the clients after receiving all the pieces of hash data from all the clients; and the server control means controls the server communication means to receive a piece of game data from each of the clients after each of the clients receives and displays all the pieces of hash data received from the server where the piece of game data is the random number's fixed-length portions obtained as a result of fragmentation of the random number into fractions having equal bit counts.

The server control means may control the server communication means to transmit back all the pieces of game data received by the server communication means from all the clients to each of the clients.

The game means may implement the game by using all the pieces of game data received by the server communication means from all the clients.

According to a specific ninth aspect of the present invention, there is provided a client connected to a server by a communication network, the client comprising a display means for displaying information, a client communication means for carrying out communications through the communication network, a random-number generation means for generating a random number, a hash-data generation means for generating hash data of the random number, a game-data generation means for generating pieces of game data, which are each the random number's fixed-length portions obtained as a result of fragmentation of the random number into fractions having equal bit counts, and a client control means, wherein:

the client control means controls the client communication means to transmit the hash data to the server;

the server receives all pieces of hash data from all clients connected to the server and transmits back all the pieces of hash data to each of the clients connected to the server; and the client control means controls the display means to display all the pieces of hash data transmitted back by the server and received by the client communication means, and controls the client communication means to transmit the game data to the server after receiving all the pieces of hash data from the server and displaying all the pieces of hash data.

The client communication means may exchange information with the server and a plurality of other clients on the basis of a public-key encryption technique; the random-number generation means has a key generation means for generating a public key and a secret key by adoption of the public-key encryption technique; and the random-number generation means generates the random number in a process to generate the public and secret keys.

According to a specific tenth aspect of the present invention, there is provided a program to be executed by a server connected to a plurality of clients by a communication network, the program comprising:

a thirtieth step of receiving hash data of a random number, which is generated by each of the clients, from each of the clients;

a thirty-first step of transmitting all pieces of hash data received from all the clients back to each of the clients after reception of all the pieces of hash data from all the clients at the thirtieth step;

a thirty-second step, which is executed to request each of the clients to transmit game data to the network after all the pieces of hash data transmitted by the server to each of all the clients at the thirty-first step are displayed by each of the clients on a display means of each of the clients, where the game data is the random number's fixed-length portions obtained as a result of fragmentation of the random number into fractions having equal bit counts; and a thirty-third step of carrying out a game based on pieces of game data received from all the clients at the thirty-second step.

According to a specific tenth aspect of the present invention, there is provided a program to be executed by a client connected to a server by a communication network, the program comprising:

a fortieth step of generating a random number and hash data of the random number;

a forty-first step of transmitting the hash data generated at the fortieth step to the server;

a forty-second step, which is executed to receive pieces of hash data from the server and display the pieces of hash data on a display means of the client when the pieces of data are transmitted back by the server to the client and each of other clients connected to the server after the server receives all the pieces of hash data from the client and the other clients at the forty-first step; and a forty-third step of transmitting game data to the server after the forty-second step where the game data is the random number's fixed-length portions obtained as a result of fragmentation of the random number into fractions having equal bit counts.

According to a specific twelfth aspect of the present invention, there is provided a method adopted by a server connected to a plurality of clients via a communication network, comprising:

a server communication step of carrying out communication with the clients;

a server control step of transmitting, when receiving all of hash data generated from a random number by each of the clients in the server communication step, transmitting back all of the hash data to the client; and a game implementing step of implementing game by using game data supplied from each of the clients in the server communication step;

wherein in the server communication step, after all of the hash data received by each of the clients are displayed on the client, game data obtained as a result of fragmentation of the random number into fractions having equal bit counts are received from each client.

With these configurations, after all the pieces of hash data are displayed on each of the clients, each of the clients transmits the game data to the server. Thus, if the game data is subjected to a cheating such as falsification, there will be a contradictory relation between the game data and one of the pieces of hash data, which is associated with the game data. As a result, the cheating can be pointed out.

According to an eighth aspect of the present invention, there is provided an information-processing system, which comprises a plurality of information-processing apparatus connected to each other by a communication network and is used for distributing different pieces of utilization information to the information-processing apparatus in such a way that none of the information-processing apparatus receive the same piece of utilization information as other ones of the information-processing apparatus, wherein:

a first one of the first information-processing apparatus comprises:

a select means for selecting a piece of select information among a plurality of pieces of the select information shared and used by all the information-processing apparatus as information common to all the information-processing apparatus;

a select-information-invalidating means for putting the piece of the select information selected by the select means in unselectable status; and a transmission means for transmitting the piece of the select information selected by the select means to a second one of the information-processing apparatus, the second one the second information-processing apparatus comprises:

a storage means for storing a relation associating the select information with intermediate information; and a transmission means for transmitting the intermediate information associated with the piece of the select information received from the first information-processing apparatus to the first information-processing apparatus, the first information-processing apparatus further comprises:

a storage means for storing a relation associating the intermediate information associated with the select information with utilization information; and an identification means for identifying a piece of the utilization information associated with the intermediate information received from the second information-processing apparatus, wherein the identification means employed in the first information-processing apparatus univocally identifies a piece of the utilization information in accordance with the piece of the select information selected by the select means also employed in the first information-processing apparatus without regard to which other one of the information-processing apparatus serves as the second information-processing apparatus.

In the information-processing system, preferably, the intermediate information varies from one to another among the information-processing apparatus.

The information-processing system may further have an information management apparatus, which is connected to the information-processing apparatus by a communication network and includes a storage means for storing the select information.

The first and second information-processing apparatus may generate a first random number and a second random number respectively; the first information-processing apparatus may generate the intermediate information on the basis of the utilization information and the first random number; the second information-processing apparatus may generate the select information on the basis of the intermediate information and the second random number; and the select information may be determined in accordance with the utilization information independently of the first and second random numbers.

With this configuration of the information-processing system, each of the information-processing apparatus transmits the elemental information to the information management apparatus after reception of the authentication information from the information management apparatus. Thus, if the elemental information is falsified for example during transmission through the communication network or in the information management apparatus, the information-processing apparatus is capable of pointing out a cheating of the falsification by using the received authentication information. In addition, if any one of the information-processing apparatus modifies elemental information transmitted by itself, a cheating of the modification can be pointed out by using information transmitted by the other ones of the information-processing apparatus as a base. Thus, it is not necessary for the information-processing apparatus to transmit elemental information at the same time to the information management apparatus. That is to say, the information-processing apparatus are allowed to transmit elemental information at different times to the information management apparatus.

According to a ninth aspect of the present invention, there is provided an information-processing apparatus in an information-processing system, which comprises a plurality of information-processing apparatus connected to each other by a communication network and is used for distributing different pieces of utilization information to the information-processing apparatus in such a way that none of the information-processing apparatus receive the same piece of utilization information as other ones of the information-processing apparatus, the information-processing apparatus comprising:

a select means for selecting a piece of select information among a plurality of pieces of the select information shared and used by all the information-processing apparatus as information common to all the information-processing apparatus;

a select-information-invalidating means for putting the piece of the select information selected by the select means in unselectable status;

a transmission means for transmitting the piece of the select information selected by the select means to another one of the information-processing apparatus, a storage means for storing a relation associating intermediate information associated with the select information with utilization information; and an identification means for identifying a piece of the utilization information associated with the intermediate information received from the other information-processing apparatus, wherein the identification means univocally identifies a piece of the utilization information in accordance with the piece of the select information selected by the select means without regard to which one of the information-processing apparatus serves as the other information-processing apparatus.

In the information-processing apparatus, preferably, the intermediate information varies from one to another among a plurality of the information-processing apparatus; and the storage means is used for storing a relation associating the utilization information with the intermediate information varies from one to another among a plurality of the information-processing apparatus.

With this configuration of the information-processing apparatus, each of the information-processing apparatus transmits the elemental information to the information management apparatus after reception of the authentication information from the information management apparatus. Thus, if the elemental information is falsified for example during transmission through the communication network or in the information management apparatus, the information-processing apparatus is capable of pointing out a cheating of the falsification by using the received authentication information. In addition, if any one of the information-processing apparatus modifies elemental information transmitted by itself, a cheating of the modification can be pointed out by using information transmitted by the other ones of the information-processing apparatus as a base. Thus, it is not necessary for the information-processing apparatus to transmit elemental information at the same time to the information management apparatus. That is to say, the information-processing apparatus are allowed to transmit elemental information at different times to the information management apparatus.

According to a tenth aspect of the present invention, there is provided an information-processing method adopted in information-processing system, which comprises a plurality of information-processing apparatus connected to each other by a communication network and is used for distributing different pieces of utilization information to the information-processing apparatus in such a way that none of the information-processing apparatus receive the same piece of utilization information as other ones of the information-processing apparatus, the information-processing method comprising:

a select step of selecting a piece of select information in a first one of the information-processing apparatus among a plurality of pieces of the select information shared and used by all the information-processing apparatus as information common to all the information-processing apparatus;

a select-information-invalidating step of putting the piece of the select information selected at the select step in unselectable status;

a transmission step of transmitting the piece of the select information selected at the select step from the first information-processing apparatus to a second one of the information-processing apparatus, a first storage step of storing a relation associating the select information with intermediate information in the second information-processing apparatus;

a transmission step of transmitting the intermediate information associated with the piece of the select information received from the first information-processing apparatus from the second information-processing apparatus to the first information-processing apparatus, a second storage step of storing a relation associating the intermediate information associated with the select information with utilization information in the first information-processing apparatus; and an identification step of identifying a piece of the utilization information associated with the intermediate information received by the first information-processing apparatus from the second information-processing apparatus, whereby the identification step executed by the first information-processing apparatus univocally identifies a piece of the utilization information in accordance with the piece of the select information selected at the select step also executed by the first information-processing apparatus without regard to which other one of the information-processing apparatus serves as the second information-processing apparatus.

The first and second information-processing apparatus may generate a first random number and a second random number respectively; the first information-processing apparatus may generate the intermediate information on the basis of the utilization information and the first random number; the second information-processing apparatus may generate the select information on the basis of the intermediate information and the second random number; and the select information may be determined in accordance with the utilization information independently of the first and second random numbers.

With this configuration of the information-processing method, a piece of select information associated with a piece of utilization information is selected and the selected piece of select information is put in unselectable status. Thus, a plurality of pieces of utilization information can be so distributed to the information-processing apparatus that none of the information-processing apparatus receive the same piece of utilization information as other ones of the information-processing apparatus. At that time, a relation between the selected piece of select information and a piece of utilization information is invisible to the information-processing apparatus selecting the piece of select information. By the same token, a relation between the intermediate information and the utilization information is invisible to the information-processing apparatus associating the select information with the intermediate information. Thus, unfalsified utilization information can be distributed in distribution of the pieces of utilization information.

According to an eleventh aspect of the present invention, there is provided an information-processing method adopted by an information-processing apparatus in an information-processing system, which comprises a plurality of information-processing apparatus connected to each other by a communication network and is used for distributing different pieces of utilization information to the information-processing apparatus in such a way that none of the information-processing apparatus receive the same piece of utilization information as other ones of the information-processing apparatus, the information-processing method comprising:

a select step of selecting a piece of select information among a plurality of pieces of the select information shared and used by all the information-processing apparatus as information common to all the information-processing apparatus;

a select-information-invalidating step of putting the piece of the select information selected at the select step in unselectable status;

a transmission step of transmitting the piece of the select information selected at the select step to another one of the information-processing apparatus, a storage step of storing a relation associating intermediate information associated with the select information with utilization information; and an identification step of identifying a piece of the utilization information associated with the intermediate information received from the other information-processing apparatus, whereby the identification step univocally identifies a piece of the utilization information in accordance with the piece of the select information selected at the select step without regard to which one of the information-processing apparatus serves as the other information-processing apparatus.

With this configuration of the information-processing method, a piece of select information associated with a piece of utilization information is selected and the selected piece of select information is put in unselectable status. Thus, a plurality of pieces of utilization information can be so distributed to the information-processing apparatus that none of the information-processing apparatus receive the same piece of utilization information as other ones of the information-processing apparatus. At that time, a relation between the selected piece of select information and a piece of utilization information is invisible to the information-processing apparatus selecting the piece of select information. By the same token, a relation between the intermediate information and the utilization information is invisible to the information-processing apparatus associating the select information with the intermediate information. Thus, unfalsified utilization information can be distributed in distribution of the pieces of utilization information.

According to a twelfth aspect of the present invention, there is provided a program to be executed by a computer for controlling an information-processing apparatus in an information-processing system, which comprises a plurality of information-processing apparatus connected to each other by a communication network and is used for distributing different pieces of utilization information to the information-processing apparatus in such a way that none of the information-processing apparatus receive the same piece of utilization information as other ones of the information-processing apparatus, the program comprising:

a select step of selecting a piece of select information among a plurality of pieces of the select information shared and used by all the information-processing apparatus as information common to all the information-processing apparatus;

a select-information-invalidating step of putting the piece of the select information selected at the select step in unselectable status;

a transmission step of transmitting the piece of the select information selected at the select step to another one of the information-processing apparatus, a storage step of storing a relation associating intermediate information associated with the select information with utilization information; and an identification step of identifying a piece of the utilization information associated with the intermediate information received from the other information-processing apparatus, whereby the identification step univocally identifies a piece of the utilization information in accordance with the piece of the select information selected at the select step without regard to which one of the information-processing apparatus serves as the other information-processing apparatus.

With this configuration of the program, a piece of select information associated with a piece of utilization information is selected and the selected piece of select information is put in unselectable status. Thus, a plurality of pieces of utilization information can be so distributed to the information-processing apparatus that none of the information-processing apparatus receive the same piece of utilization information as other ones of the information-processing apparatus. At that time, a relation between the selected piece of select information and a piece of utilization information is invisible to the information-processing apparatus selecting the piece of select information. By the same token, a relation between the intermediate information and the utilization information is invisible to the information-processing apparatus associating the select information with the intermediate information. Thus, unfalsified utilization information can be distributed in distribution of the pieces of utilization information.

According to a specific thirteenth aspect of the present invention, there is provided a communication game system for carrying out a game and comprising a plurality of mutually communicatable clients each assigned to one of player participating in the game wherein a plurality of cards is taken from a deck consisting of cards each laid face down and distributed to the players with each of the distributed cards also laid face down as it is, and an identification number X is assigned to each of the cards in advance, the communication game system comprising:

a prime-number setting means for setting a prime number w to be used as data common to all the clients;

a random-number generation means assigned to each of the clients and used for generating a random number a for the client to which the random-number generation means is assigned;

a first-table creation means assigned to each of the clients and used generating a piece of first data U ($=X^a$ (mod w)) for each of the identification numbers X from the prime number w and the random number a and creating a first table showing the identification numbers X each associated with the piece of first data U ($=X^a$ (mod w));

a first-data transmission means assigned to each of the clients and used for transmitting all pieces of first data U included in the first table to each of the other ones of the clients in a random order;

a second-table creation means assigned to each of the clients and used for generating a piece of second data V ($=U^a$ (mod w)) for each of the piece of first data U from the prime number w and the random number a and creating a second table showing all pieces of first data U received from the first-data transmitting client and each associated with the piece of second data V ($=U^a$ (mod w));

a second-data transmission means assigned to each of the clients and used for transmitting all pieces of second data V included in the second table from any one of the clients to each of the other ones of the clients in a random order;

a third-table creation means for creating a third table showing all pieces of second data V arranged in a random order;

a distribution means for delivering a specific one of the cards to a specific one of the players by executing the steps of:

requesting a specific one of the clients used by the specific player to selectively fetch a piece of second data V from the third table;

requesting another one of the clients to fetch a piece of first data U associated with the fetched piece of second data V from the second table assigned to the other client and transmit the fetched piece of first data U to the specific client used by the specific player to receive the specific card represented by a specific one of the identification numbers X associated with the fetched piece of first data U; and deleting the fetched piece of second data V from the third table; and an identification-number identification means assigned to each of the clients and used for identifying one of the identification numbers X, which is associated with a piece of first data U transmitted at one of the steps executed by the distribution means, among the identification numbers X listed in the first table.

According to a specific fourteenth aspect of the present invention, there is provided a server connected to a plurality of clients by a communication network and used for carrying out a game by facilitating communications among the clients each assigned to one of players participating in the game in which a plurality of cards is taken from a deck including cards each laid face down and distributed to the players with each of the cards also laid face down as it is, and an identification number X is assigned to each of the cards in advance, the server comprising:

a prime-number setting means for setting a prime number w to be used as data common to all the clients;

a third-table creation means; and a distribution means, wherein:

each of the clients:

generates its own random number a;

generates a piece of first data U ($=X^a$ (mod w)) for each of the identification numbers X from the prime number w and the random number a and creates a first table showing the identification numbers X each associated with the piece of first data U ($=X^a$ (mod w));

transmits all pieces of first data U included in the first table to each of the other ones of the clients in a random order;

generates a piece of second data V ($=U^a$ (mod w)) for each of the piece of first data U from the prime number w and the random number a and creates a second table showing all pieces of first data U received from the first-data transmitting client and each associated with the piece of second data V ($=U^a$ (mod w));

transmits all pieces of second data V included in the second table to each of the other ones of the clients in a random order; and identifies one of the identification numbers X, which is associated with a piece of first data U received from another one of the clients through the distribution means, among the identification numbers X listed in the first table;

the third-table creation means creates a third table showing all pieces of second data V arranged in a random order;

in a process of passing a specific one of the cards to a specific one of the players, the distribution means executes the steps of:

requesting a specific one of the clients used by the specific player to selectively fetch a piece of second data V from the third table;

requesting another one of the clients to fetch a piece of first data U associated with the fetched piece of second data V from the second table assigned to the other client and transmit the fetched piece of first data U to the specific client used by the specific player to receive the specific card represented by a specific one of the identification numbers X associated with the fetched piece of first data U; and deleting the fetched piece of second data V from the third table.

According to a specific fifteenth aspect, there is provided a client, which is assigned to a player participating in a game carried out by exchanging information among the player and other players also participating in the games and is connected in a mutually communicatable way to a server and other clients each assigned to one of the other players wherein a plurality of cards is taken from a deck including cards each laid face down and distributed to the players with each distributed card also laid face down as it is, and an identification number x is assigned to each of the cards in advance, the client comprising:

a random-number generation means for generating a random number a;

a first-table creation means for generating a piece of first data U ($=X^a$ (mod w)) for each of the identification numbers X from the prime number w and the random number a and creating a first table showing the identification numbers X each associated with the piece of first data U ($=X^a$ (mod w));

a first-data transmission means for transmitting all pieces of first data U included in the first table to each of the other ones of the clients in a random order;

a second-table creation means for generating a piece of second data V ($=U^a$ (mod w)) for each of the piece of first data U from the prime number w and the random number a and creating a second table showing all pieces of first data U received from the first-data transmitting client and each associated with the piece of second data V ($=U^a$ (mod w));

a second-data transmission means for transmitting all pieces of second data V included in the second table to each of the other ones of the clients in a random order; and an identification-number identification means, wherein:

the server delivers a specific one of the cards to a specific one of the players by executing the steps of:

requesting a specific one of the clients used by the specific player to selectively fetch a piece of second data V from a third table created by the server as a list of all the pieces of second data V, which are arranged in a random order;

requesting another one of the clients to fetch a piece of first data U associated with the fetched piece of second data V from the second table assigned to the other client and transmit the fetched piece of first data U to the specific client used by the specific player to receive the specific card represented by a specific one of the identification numbers X associated with the fetched piece of first data U; and deleting the fetched piece of second data V from the third table; and the identification-number identification means identifies one of the identification numbers X, which is associated with a piece of first data U received by the client from another one of the clients through the server, among the identification numbers X listed in the first table, According to a specific sixteenth aspect of the present invention, there is provided a program to be executed by a server connected to a plurality of clients by a communication network and used for carrying out a game by facilitating communications among the clients each assigned to one of players participating in the game in which a plurality of cards is taken from a deck including cards each laid face down and distributed to the players with each of the cards also laid face down as it is, and an identification number X is assigned to each of the cards in advance, the program comprising:

a prime-number setting step of setting a prime number w to be used as data common to all the clients;

a third-table creation step; and a distribution step, wherein:

each of the clients:

generates its own random number a;

generates a piece of first data U ($=X^a \pmod{w}$) for each of the identification numbers X from the prime number w and the random number a and creates a first table showing the identification numbers X each associated with the piece of first data U ($=X^a \pmod{w}$);

transmits all pieces of first data U included in the first table to each of the other ones of the clients in a random order;

generates a piece of second data V ($=U^a \pmod{w}$) for each of the piece of first data U from the prime number w and the random number a and creates a second table showing all pieces of first data U received from the first-data transmitting client and each associated with the piece of second data V ($=U^a \pmod{w}$);

transmits all pieces of second data V included in the second table to each of the other ones of the clients in a random order; and identifies one of the identification numbers X, which is associated with a piece of first data U received from another one of the clients through the distribution step, among the identification numbers X listed in the first table;

at the third-table creation step, a third table showing all pieces of second data V arranged in a random order is created;

the distribution step is executed in a process of passing a specific one of the cards to a specific one of the players by execution of the sub-steps of:

requesting a specific one of the clients used by the specific player to selectively fetch a piece of second data V from the third table;

requesting another one of the clients to fetch a piece of first data U associated with the fetched piece of second data V from the second table assigned to the other client and transmit the fetched piece of first data U to the specific client used by the specific player to receive the specific card represented by a specific one of the identification numbers X associated with the fetched piece of first data U; and deleting the fetched piece of second data V from the third table.

According to a specific seventeenth aspect, there is provided a program to be executed by a client, which is assigned to a player participating in a game carried out by exchanging information among the player and other players also participating in the games and is connected in a mutually communicatable way to a server and other clients each assigned to one of the other players wherein a plurality of cards is taken from a deck including cards each laid face down and distributed to the players with each distributed card also laid face down as it is, and an identification number X is assigned to each of the cards in advance, the program comprising the steps of:

generating its own random number a;

generating a piece of first data U ($=X^a \pmod{w}$) for each of the identification numbers X from the prime number w and the random number a and creating a first table showing the identification numbers X each associated with the piece of first data U ($=X^a \pmod{w}$);

transmitting all pieces of first data U included in the first table to each of the other ones of the clients in a random order;

generating a piece of second data V ($=U^a \pmod{w}$) for each of the piece of first data U from the prime number w and the random number a and creating a second table showing all pieces of first data U received from the first-data transmitting client and each associated with the piece of second data V ($=U^a \pmod{w}$);

transmitting all pieces of second data V included in the second table to each of the other ones of the clients in a random order;

creating a third table showing all pieces of second data V arranged in a random order; and identifying an identification number, wherein:

the server delivers a specific one of the cards to a specific one of the players by executing the steps of:

requesting a specific one of the clients used by the specific player to selectively fetch a piece of second data V from a third table created by the server as a list of all the pieces of second data V, which are arranged in a random order;

requesting another one of the clients to fetch a piece of first data U associated with the fetched piece of second data V from the second table assigned to the other client and transmit the fetched piece of first data U to the specific client used by the specific player to receive the specific card represented by a specific one of the identification numbers X associated with the fetched piece of first data U; and deleting the fetched piece of second data V from the third table; and at the step of identifying an identification number, the program identifies one of the identification numbers X, which is associated with a piece of first data U received by the client from another one of the clients through the server, among the identification numbers X listed in the first table.

According to a specific eighteenth aspect of the present invention, there is provided a communication game method adopted by a server connected to a plurality of clients by a communication network and used for carrying out a game by facilitating communications among the clients each assigned to one of players participating in the game in which a plurality of cards is taken from a deck including cards each laid face down and distributed to the players with each of the cards also laid face down as it is, and an identification number X is assigned to each of the cards in advance, the method comprising:

a prime-number setting step of setting a prime number w to be used as data common to all the clients;

a third-table creation step; and a distribution step, wherein:

each of the clients:

generates its own random number a;

generates a piece of first data U ($=X^a \pmod{w}$) for each of the identification numbers X from the prime number w and the random number a and creates a first table showing the identification numbers X each associated with the piece of first data U ($=X^a \pmod{w}$);

transmits all pieces of first data U included in the first table to each of the other ones of the clients in a random order;

generates a piece of second data V ($=U^a \pmod{w}$) for each of the piece of first data U from the prime number w and the random number a and creates a second table showing all pieces of first data U received from the first-data transmitting client and each associated with the piece of second data V ($=U^a \pmod{w}$);

transmits all pieces of second data V included in the second table to each of the other ones of the clients in a random order; and identifies one of the identification numbers X, which is associated with a piece of first data U received from another one of the clients through the distribution step, among the identification numbers X listed in the first table;

at the third-table creation step, a third table showing all pieces of second data V arranged in a random order is created;

the distribution step is executed in a process of passing a specific one of the cards to a specific one of the players by execution of the sub-steps of:

requesting a specific one of the clients used by the specific player to selectively fetch a piece of second data V from the third table;

requesting another one of the clients to fetch a piece of first data U associated with the fetched piece of second data V from the second table assigned to the other client and transmit the fetched piece of first data U to the specific client used by the specific player to receive the specific card represented by a specific one of the identification numbers X associated with the fetched piece of first data U; and deleting the fetched piece of second data V from the third table.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 5 is a flowchart representing operations of the first embodiment;

FIG. 16A is an explanatory diagram showing a first table of a client apparatus on the left side in FIG. 14;

FIG. 16B is an explanatory diagram showing a first table of a client apparatus on the right side in FIG. 14;

FIG. 17A is an explanatory diagram showing a second table of a client apparatus on the left side in FIG. 14;

FIG. 17B is an explanatory diagram showing a second table of a client apparatus on the right side in FIG. 14; and FIG. 18 is an explanatory diagram showing a third table.

PREFERRED EMBODIMENTS OF THE INVENTION

First Embodiment

The following description explains a first embodiment implementing a communication game system, a communication game method, a server, clients and programs which are provided by the present invention.

It is to be noted that, in the first to third embodiments described below, a game is played as a kind of gambling.

Figure 2:
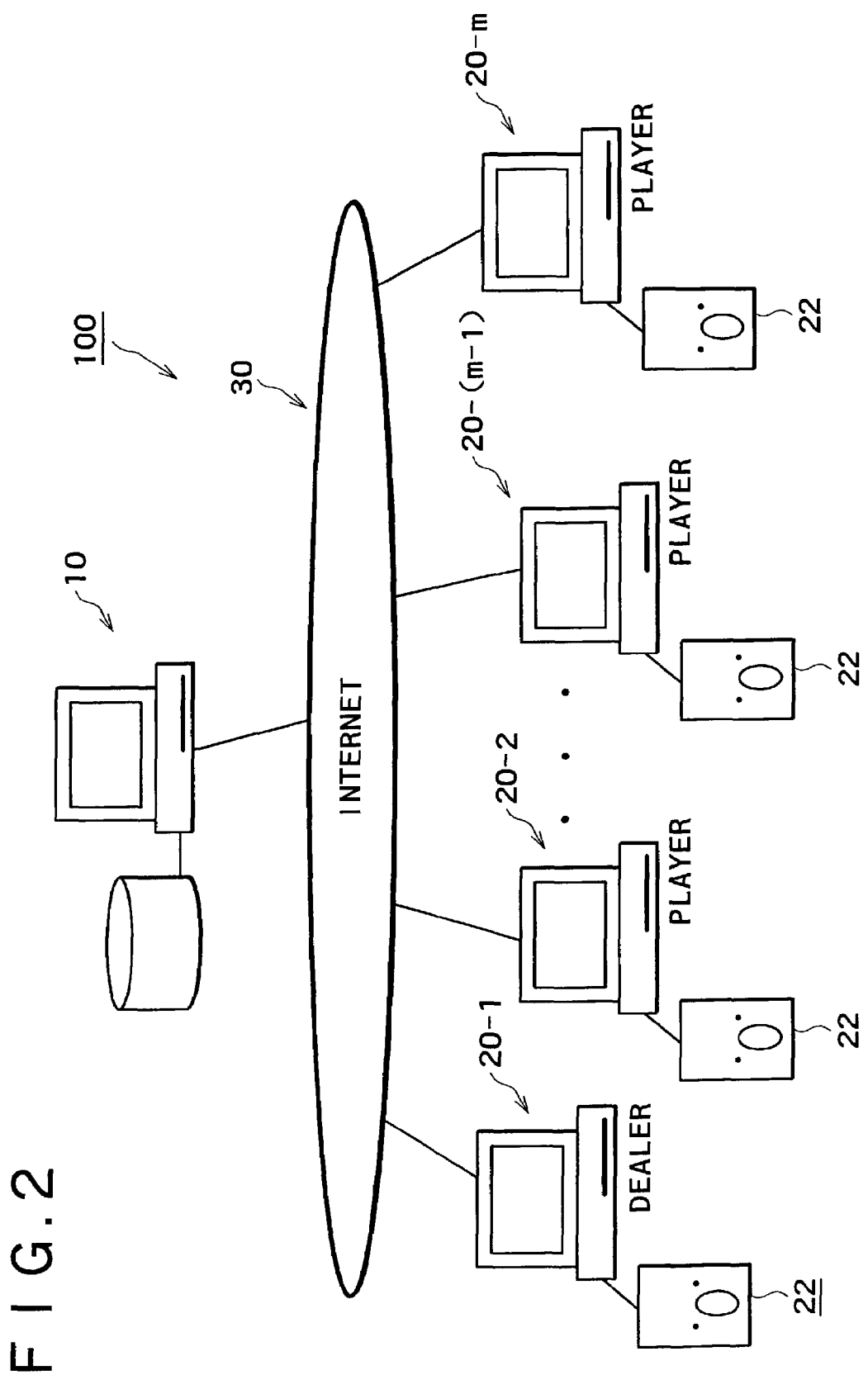
FIG. 2 is a diagram showing the configuration of a communication game system, which is implemented by the first embodiment of the present invention, in a simple and plain manner.

FIG. 2 is a diagram showing the configuration of the communication game system in a simple and plain manner.

The communication game system 100 has a configuration wherein a server apparatus 10 is connected to a plurality of client apparatuses 20-1 to 20-m by the Internet 30 serving as communication network for linking the server apparatus 10 to the client apparatus 20.

The configuration allows exchanges of information between the server apparatus 10 and the client apparatus 20 to be based on a public-key encryption technique. That is to say, the server apparatus 10 and the client apparatus 20 form a PKI (Public Key Infrastructure).

Figure 1:
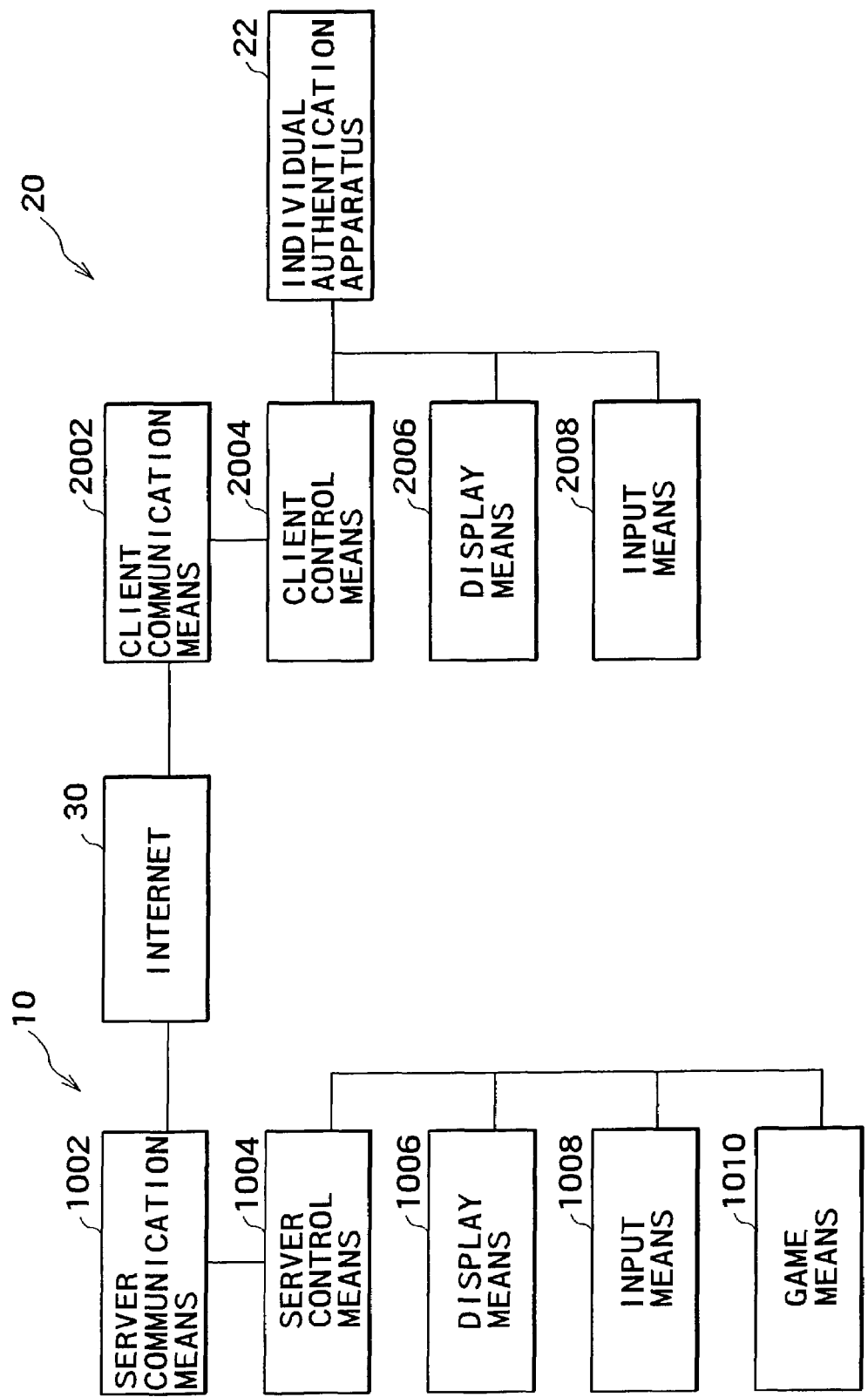
FIG. 1 is a block diagram showing the configurations of a server apparatus and a client apparatus, which are implemented by a first embodiment of the present invention, in a simple and plain manner.

FIG. 1 is a block diagram showing the configurations of the server apparatus 10 and the client apparatus 20 in a simple and plain manner.

As shown in FIG. 1, the server apparatus 10 is a computer with a configuration comprising a server communication means 1002, a server control means 1004, a server display means 1006, a server input means 1008 and a game means 1010.

The server communication means 1002 has a configuration for carrying out communications with the client apparatus 20 through the Internet 30.

The server control means 1004 controls the other components.

The server display means 1006 is a monitor unit having a configuration for displaying pictures required in playing a game on a screen.

The server input means 1008 has a configuration including a mouse and a keyboard, which are operated for entering information required in playing a game.

Used for implementing games, the game means 1010 has a CPU for executing software of the games.

It is to be noted that, since details of processing carried out by the game means 1010 to implement games are not directly relevant to essentials of the present invention, explanation of the details is omitted. Only the substance of processing required in the explanation of operations will be described in a simple manner.

In addition, the server apparatus 10 has a configuration in which the CPU executes a server program installed in a hard-disk drive serving as a storage means employed in the computer.

It is to be noted that the server program can be installed into the server apparatus 10 by downloading the program through the Internet 30 or by reading in the program from a recording medium such as a CD-ROM, which is used for storing the program, through a CD-ROM drive.

The client apparatus 20 has a configuration connectable to an individual authentication apparatus 22 to be described later. In this embodiment, the client apparatus 20 and the individual authentication apparatus 22 form a client provided by the present invention.

The client apparatus 20 is a computer having a configuration comprising a client communication means 2002, a client control means 2004, a display means 2006 and an input means 2008.

The client communication means 2002 has a configuration for carrying out communications with the server apparatus 10 through the Internet 30.

The client control means 2004 controls the other components.

The client display means 2006 is a monitor unit having a configuration for displaying pictures required in playing a game on a screen.

The client input means 2008 has a configuration including a mouse and a keyboard, which are operated for entering information required in playing a game.

In addition, the client apparatus 20 has a configuration in which a CPU executes a client program installed in a hard-disk drive serving as a storage means employed in the computer.

It is to be noted that the client program can be installed into the client apparatus 20 by downloading the program through the Internet 30 or by reading in the program from a recording medium such as a CD-ROM, which is used for storing the program, through a CD-ROM drive.

The client apparatus 20 can be connected to the individual authentication apparatus 22.

The individual authentication apparatus 22 authenticates a person registered in advance as a player operating the client apparatus 20. A player needs to be authenticated individually in order to prevent underage youngsters from gambling.

Figure 3:
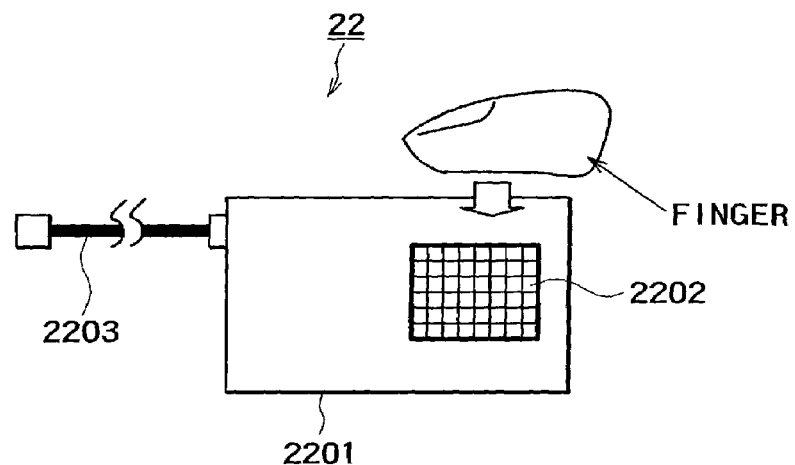
FIG. 3 is a diagram showing an external view of an individual authentication apparatus.

As shown in FIG. 3, the individual authentication apparatus 22 has a fingerprint collation sensor 2202 at a location on the outer side of a case 2201. The individual authentication apparatus 22 has a configuration capable of exchanging information with the client apparatus 20 through a cable 2203. The exchanges of information are typically based on a USB standard.

Figure 4:
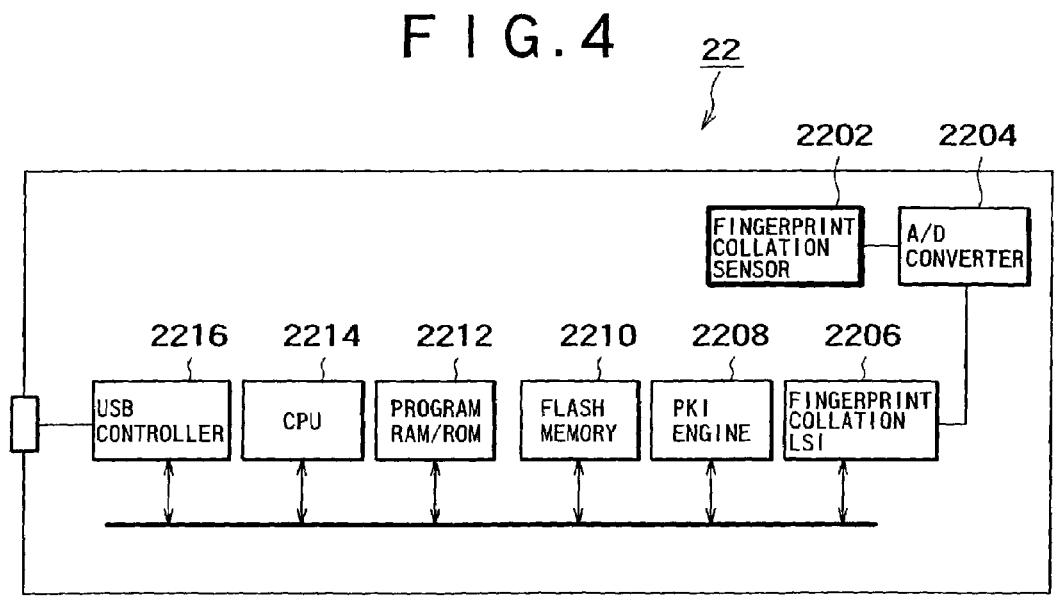
FIG. 4 is a block diagram showing the configuration of the individual authentication apparatus.

As shown in FIG. 4, the individual authentication apparatus 22 comprises an A/D converter 2204, a USB controller 2216, a CPU 2214, a program RAM/ROM 2212, a flash memory 2210, a PKI engine 2208 serving as a game-data generation means and a fingerprint collation LSI 2206 in addition to the fingerprint collation sensor 2202.

In addition, the USB controller 2216, the CPU 2214, the program RAM/ROM 2212, the flash memory 2210, the PKI engine 2208 and the fingerprint collation LSI 2206 are connected to each other by a common bus.

The fingerprint collation sensor 2202 fetches a fingerprint from a finger placed on the fingerprint collation sensor 2202 and outputs fingerprint data (gray scale data).

The A/D converter 2204 converts an analog signal representing the fingerprint data into a digital signal.

The fingerprint collation LSI 2206 generates template data of a characteristic portion from the digital data and stores the template data in the flash memory 2210.

The PKI engine 2208 generates a public key and a secret key, which are required for communications based on a public-key encryption technique, and carries out encryption and decryption processes based on the public and secret keys. It is to be noted that the generation of public and secret keys will be described later.

The flash memory 2210 has a configuration for storing the template data and chip data to be given to the player in exchange for stakes paid by the player.

The program RAM/ROM 2212 is used for storing a control program of the individual authentication apparatus 22.

The USB controller 2216 is an interface for exchanging information with the client apparatus 20.

The CPU 2214 controls the other components by execution of the control program.

Next, operations of the individual authentication apparatus 22 are explained.

First of all, an operation to register a player using the client apparatus 20 is described.

The player puts a finger on the fingerprint collation sensor 2202 of the individual authentication apparatus 22. Fingerprint data of the finger is fetched and supplied to the fingerprint collation LSI 2206 by way of the A/D converter 2204. The template data is stored in the flash memory 2210. In this way, the fingerprint data of the player is registered.

Next, an operation to authenticate a player is explained.

The player puts a finger on the fingerprint collation sensor 2202 of the individual authentication apparatus 22. Fingerprint data of the finger is fetched and supplied to the fingerprint collation LSI 2206 by way of the A/D converter 2204 and collated with the template data stored in the flash memory 2210. A result of the comparison is supplied to the CPU 2214.

If the collation is successful, the CPU 2214 informs the client apparatus 20 that the authentication is successful. In this case, the player is allowed to use the client apparatus 20. If the collation is unsuccessful, on the other hand, the CPU 2214 informs the client apparatus 20 that the authentication is unsuccessful. In this case, the player is not allowed to use the client apparatus 20.

The following description explains an operation carried out by the PKI engine 2208 to generate public and secret keys according to RAS system.

First of all, the client apparatus 20 gives the individual authentication apparatus 22 a command to generate public and secret keys.

The PKI engine 2208 generates a random number in accordance with the command. A random number is generated repeatedly till a non-prime number is obtained as a random number.

As a non-prime number is obtained as a random number, the random number is treated like a composite number n, which is a product of 2 prime numbers, namely, a first prime number p and a second prime number q. The composite number n is decomposed into the first prime number p and the second prime number q. The composite number n is also referred to as a modulus.

$$n = p \cdot q \quad (1)$$

Then, y is found by using Eq. (2):

$$(p-1) \cdot (q-1) + 1 = y \quad (2)$$

Subsequently, a public key e and a secret key d, which satisfy Eq. (3) showing that the product of the public key e and the secret key d is equal to y are found.

$$e \cdot d = y \quad (3)$$

Assume for example that the composite number n is 33. In this case, numbers satisfying Eqs. (1) to (3) are given as follows:

$$33 = 3 \cdot 11 \quad (1)$$

$$(3-1) \cdot (11-1) + 1 = 21 \quad (2)$$

$$3 \cdot 7 = 21 \quad (3)$$

That is to say,
composite number n=33,
public key e=3 and
secret key d=7.

Next, operations carried out to play a game are explained by referring to a flowchart shown in FIG. 5. It is to be noted that, in the case of the first embodiment, the played game is craps.

Players playing the game are a dealer playing a role to carry forward the game and one or more players participating in the game in accordance with the game's progress made by the dealer.

In this embodiment, the dealer operates the server apparatus 10 through the client apparatus 20 while each of the players operates a client apparatus 20.

First of all, players visit a registration department of a service-providing company rendering gambling services. At the first step S10 of the flowchart, each of the players proves its age and registers fingerprint data in the individual authentication apparatus 22 in order to individually register the player itself. Then, at the next step S12, each of the players pays stakes to get chip data commensurate with the stakes, and has the chip data stored in the flash memory 2210.

It is to be noted that a digital signature of the service-providing company has been put on the chip data.

Later on, at the next step S14, an individual authentication apparatus 22 is lent to each of the players.

Subsequently, at the next step S16, each of the players connects the individual authentication apparatus 22 to a client apparatus 20 to have the player authenticated individually. If the individual authentication of a player is successful, preparation of the player to participate in the game can be said to be completed.

Figure 6:
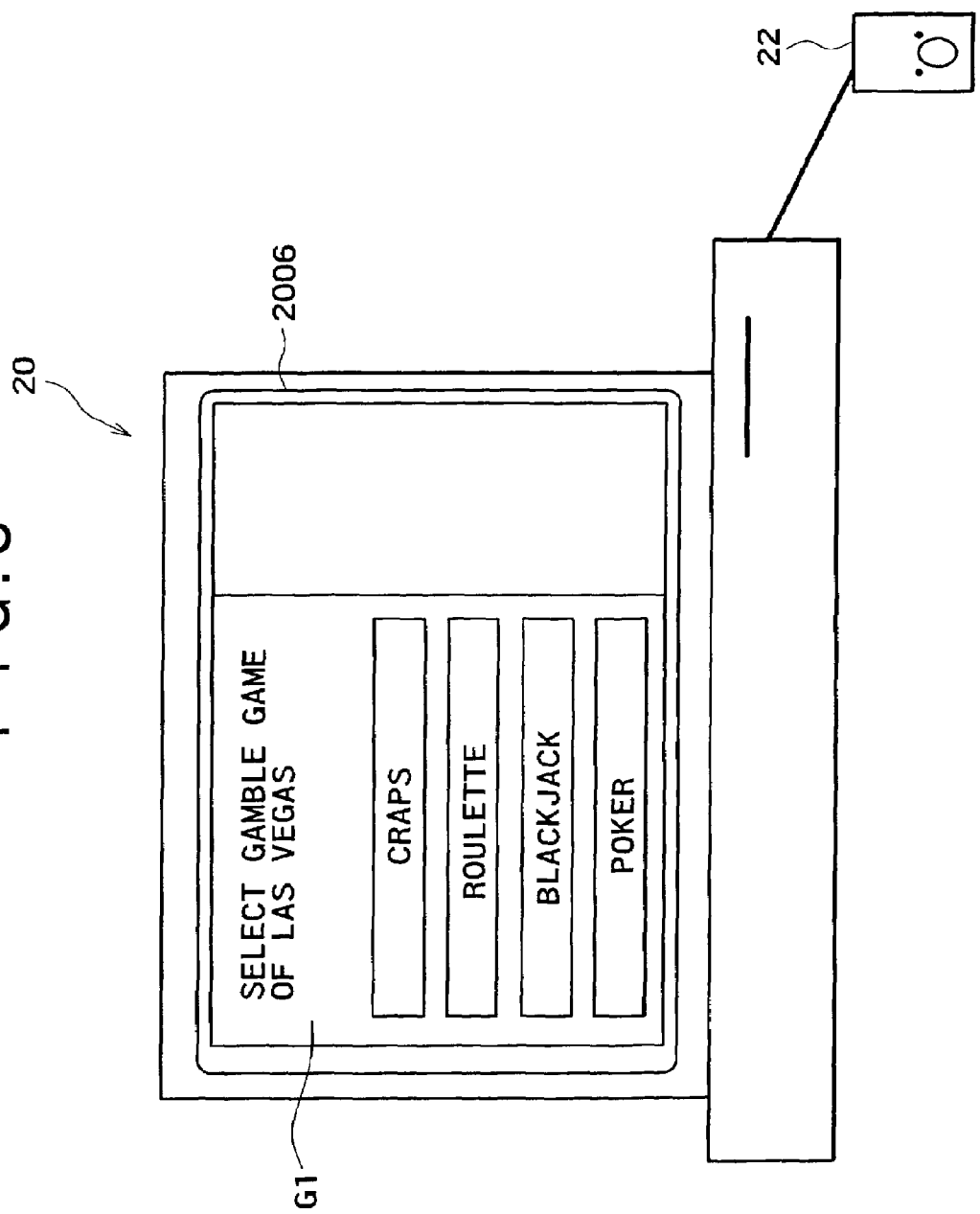
FIG. 6 is an explanatory diagram showing a menu screen.

Upon the completion of the preparation to participate in the game, at the next step S18, a menu G1 like one shown in FIG. 6 is displayed on the screen of the client display means 2006 employed in the client apparatus 20. The menu G1 is used for selecting a game.

Figure 7:
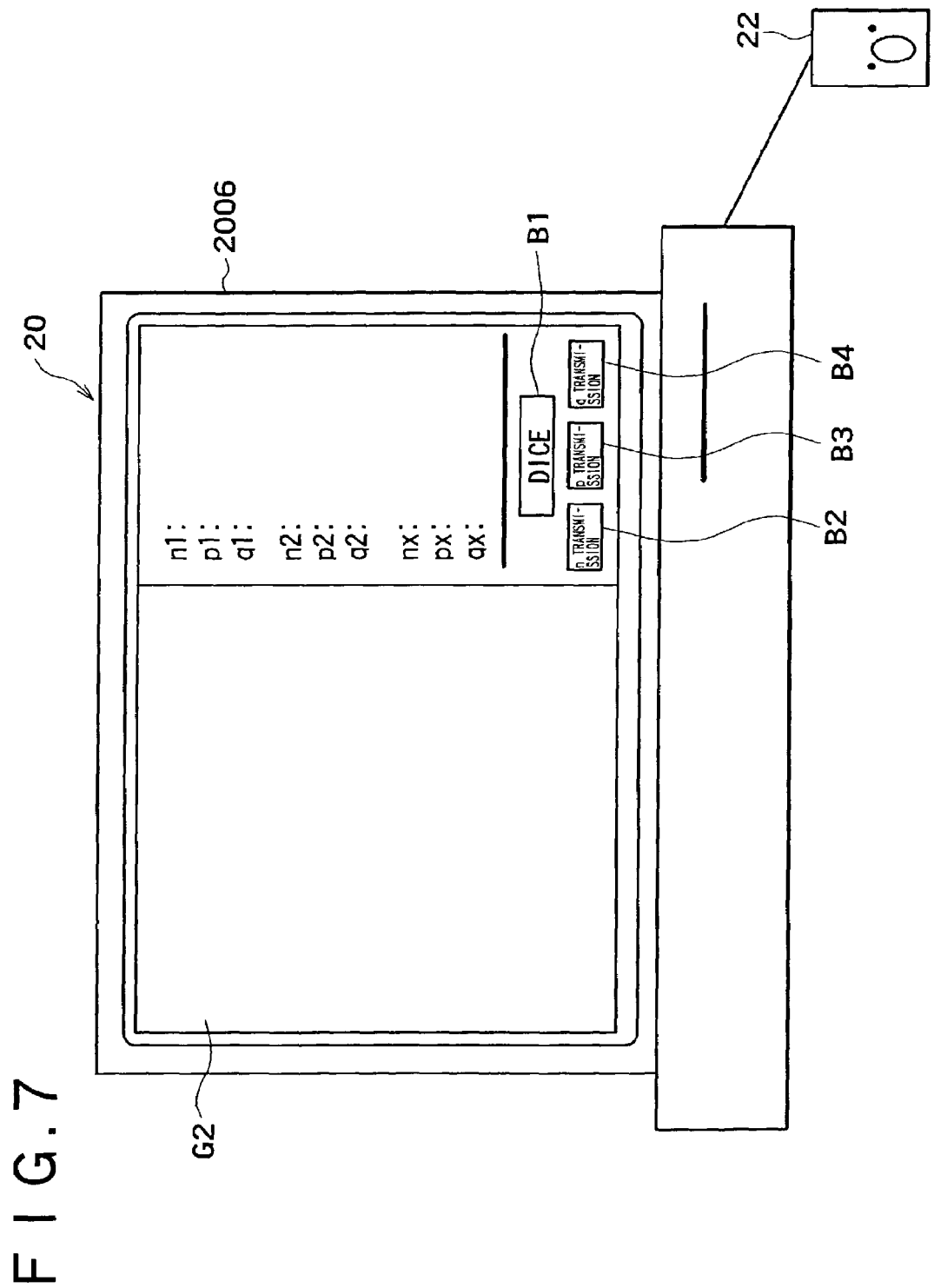
FIG. 7 is an explanatory diagram showing the screen of a display means with craps selected.

Assume for example that the craps game is selected and, then, an execution key on a keyboard of the client input means 2008 employed in the client apparatus 20 is pressed at the next step S20. In this case, a screen for playing the craps game is displayed as shown in FIG. 7.

The display appearing on the screen includes a picture G2 of a table for playing the craps game, composite numbers n, first prime numbers p and second prime numbers q. Details of the picture G2 are omitted. To put it in detail, the composite numbers n are composite numbers n1 to nx generated for all the players participating in the game. By the same token, the first prime numbers p and the second prime numbers q are the players' first prime numbers p1 to px and second prime numbers q1 to qx respectively. The composite numbers n1 to nx, the first prime numbers p1 to px and the second prime numbers q1 to qx other than those for this player are received from other client apparatus 20 of all other players participating in the game.

The display appearing on the screen also includes a dice button B1 for shaking a dice, an n transmission button B2 to be operated for transmitting a composite number n, a p transmission button B3 to be operated for transmitting a first prime number p and a q transmission button B4 to be operated for transmitting a second prime number q.

In an initial state, these buttons are set in an unoperatable state. It is to be noted that each of the buttons is displayed in different colors in accordance with whether or not the button is in an operatable state (or in a ready state). For example, if a button has been put in an operatable state, the button is displayed in a green color. If a button has been put in an unoperatable state, on the other hand, the button is displayed in a red color.

Then, at the next step S22, the player places a chip while looking at the picture of the table. To put it in detail, the player operates the mouse of the client input means 2008 to place the picture of the chip at a desired location on the picture of the table in the so-called drag-and-drop operation. This picture is displayed on the monitor unit of each client in a real-time manner. It should be noted that, when a chip is placed, stakes data for stakes is presented by the client apparatus 20 to the server apparatus 10.

It is to be noted that an operation such as that to place a chip on the table displayed on the client apparatus 20 and a display accompanying the operation are implemented by exchanging information between the server apparatus 10 and the client apparatus 20 through the Internet 30 under control executed by the server control means 1004 employed in the server apparatus 10 on the game means 1010 also employed in the server apparatus 10. Since the exchanges of information and the control are not directly relevant to essentials of the present invention, however, detailed explanation of the exchanges of information and the control is omitted.

After all the players each put a chip, the dealer operates the client input means 2008 of the client server 20 used by the dealer to put the dice button B11 in a ready state for all the client apparatus 20 of the players. Information on the operation carried out by the dealer is transmitted to the server apparatus 10 by way of the Internet 30. Recognizing the information, the server control means 1004 transmits a command to put the dice button B1 in a ready state to all the client apparatus 20 by way of the server communication means 1002. Receiving the command, the client control means 2004 employed in each of the client apparatus 20 used by a player changes the color of the dice button B1 of the client display means 2006 from a red color indicating an unoperatable state to a green color indicating an operatable state at the next step S24.

Then, at the next step S26, in response to the change of the color of the dice button B1, each of the players clicks the dice button B1 to drive the client control means 2004 employed in the client apparatus 20 to transmit a command to the individual authentication apparatus 22, requesting the individual authentication apparatus 22 that a public key and a secret key be generated.

Subsequently, at the next step S28, the individual authentication apparatus 22 carries out the operations described earlier to generate a composite number n, a first prime number p and a second prime number q and supplies these numbers to the client control means 2004.

Then, first of all, at the next step S30, the client control means 2004 puts the n transmission button B2 in an operatable state. For example, the client control means 2004 changes the color of the n transmission button B2 from a red color to a green one.

Subsequently, at the next step S32, each of the players operates the n transmission button B2 to transmit the composite number n to the server apparatus 10. In this way, the server apparatus 10 receives composite numbers n from all the players. The game means 1010 employed in the server apparatus 10 then transmits back all the received composite numbers n to each of the client apparatus 20 so that the client display means 2006 employed in each of the client apparatus 20 can display all the composite numbers n.

Accordingly, each of the players is capable of visually recognizing its own composite number n and the composite numbers n of the other players.

It is to be noted that, instead of storing the third table 1010 created at the step S28 in the server storage means 1008 employed in the server apparatus 10, the table 1010 can also be stored in the client storage means 2008 employed in each of the client apparatus 20. In this case, when a card is selected to be delivered to a specific client apparatus 20 as described above, the second data W, which is stored in all the client apparatus 20 other than the specific client apparatus 20 and corresponds to the selected card, is deleted from the specific client apparatus 20 and all the other client apparatus 20 in accordance with a command issued by the server apparatus 10 or the specific client apparatus 20.

It should be noted that the present invention can also be applied to a system comprising only client apparatus 20 connected to each other by a communication network such as the Internet. In this case, the client apparatus 20 are capable of directly exchanging first data U and second data W with each other, storing the third table 1010 in their own client storage means 2008 and selecting second data W from the third table 1010. Second data W selected by a specific client apparatus 20 as described above is reported to all the client apparatus 20 other than the specific client apparatus 20 to be deleted from the specific client apparatus 20 and all the other client apparatus 20 or put in unselectable status. Subsequently, first data U associated with the selected second data W is recognized from the second table 2012 and an identification number X associated with the recognized first data U is identified from the first table 2010 by execution of the same steps as those described above. In this way, a card identified by the identified identification number X is delivered to the specific client 20. In such a configuration, cards can thus be selected from the card deck to be passed to the players without using the server 10 in the process of selecting and delivering the cards.

Then, after transmitting all the composite numbers n back to all the client apparatus 20, the game means 1010 employed in the server apparatus 10 transmits a command to all the client apparatus 20 to request the client apparatus 20 that the buttons for transmitting a first prime number p and a second prime number q be each put in an operatable state.

In accordance with this command, the client control means 2004 puts each of the p transmission button B3 and the q transmission button B4 in an operatable state at the next step S34. For example, the client control means 2004 changes the color of each of the p transmission button B3 and the q transmission button B4 from a red color to a green one.

Subsequently, at the next step S36, each of the players operates both the p transmission button B3 and the q transmission button B4 to transmit respectively the first prime number p and the second prime number q, which were received by the client apparatus 20 from the individual authentication apparatus 22, to the server apparatus 10 as game data.

Then, the server apparatus 10 receives the first prime numbers p and the second prime numbers q from all the client apparatus 20. The game means 1010 employed in the server apparatus 10 then transmits back all the received first prime numbers p and all the received second prime numbers q to each of the client apparatus 20. Thus, the client display means 2006 employed in the client apparatus 20 is capable of displaying all the first prime numbers p and all the second prime numbers q at the next step S38.

Accordingly, each of the players is capable of visually recognizing its own first and second prime numbers p and q as well as the first and second prime numbers p and q of the other players.

Then, at the next step S39, the client control means 2004 in each of the client apparatus 20 collates each of the composite numbers n with the first and second prime numbers p and q, which are associated with the composite number n, to form a judgment as to whether or not the first and/or second prime numbers p and/or q have been falsified. All the composite numbers n, all the first prime numbers p and all the second prime numbers q have been received at the step S38 by the client communication means 2002 of the client apparatus 20. If the outcome of the judgment indicates that none of the first and second prime numbers p and q have been falsified, the flow of the routine goes on to the next step. If the outcome of the judgment indicates that the first and/or second prime numbers p and/or q have been falsified, on the other hand, the server apparatus 10 is notified of the falsification. In this case, the server apparatus 10 gives a command to all the client apparatus 20 to discontinue the game at a step S41.

Then, the game means 1010 employed in the server apparatus 10 determines 2 patterns of dice spots, that is, 2 numbers in the range 1 to 6, on the basis of the received first prime numbers p and the received second prime numbers q.

To put it in detail, assume that the first prime numbers p and the second prime numbers q, which are received by the game means 1010 employed in the server apparatus 10, are p1 to px and q1 to qx respectively.

First of all, a predetermined string of bits starting with the LSB (Least Significant Bit) of each of the first and second prime numbers is deleted from the first and second prime numbers. This is because a prime number is always an odd number having an LSB of 1. Deletion of such a string of bits discards the LSB that causes a problem to be described later.

Then, an exclusive logical sum p0 of the first prime numbers p1 to px each having the predetermined string of bits deleted is found by using Eq. (4) as follows:

$$p0 = p1 * p2 * p3 * \ldots * px \qquad (4)$$

where the symbol * denotes the processing operator of exclusive logical addition.

Subsequently, the exclusive logical sum p0 is divided by 6 and a remainder obtained from the division is used as the first pattern of dice spots. If the remainder is 0, the remainder is treated as the pattern of 6 dice spots.

At a step S40, the game means 1010 employed in the server apparatus 10 transmits the data of the first pattern of dice spots to each of the client apparatus 20 to be displayed on the client display means 2006 employed in the client apparatus 20.

By the same token, an exclusive logical sum q0 of the second prime numbers q1 to qx each having the predetermined string of bits deleted is found by using Eq. (5) as follows:

$$q0 = q1 * q2 * q3 * \ldots * qx \quad (5)$$

Subsequently, the exclusive logical sum q0 is divided by 6 and a remainder obtained from the division is used as the second pattern of dice spots. If the remainder is 0, the remainder is treated as the pattern of 6 dice spots.

At a step S42, the game means 1010 employed in the server apparatus 10 transmits the data of the second pattern of dice spots to each of the client apparatus 20 to be displayed on the client display means 2006 employed in the client apparatus 20.

If a decision as to winning or losing of the craps game is made as indicated by an affirmative outcome of a judgment formed at the next step S44 after the 2 patterns of dice spots are determined as described above, the flow of the game procedure goes on to a step S46 at which processing such as payout of stakes is carried out.

If a decision as to winning or losing of the craps game is not made as indicated by a negative outcome of the judgment formed at the step S44, on the other hand, the flow of the game procedure goes back to the step S34.

Upon completion of the processing carried out at the step S46, the flow of the game procedure goes on to a step S48 to form a judgment as to whether or not to continue the game. If the game is to be continued as indicated by an affirmative outcome of the judgment formed at the step S48, the flow of the game procedure goes back to the step S22. If the game is not to be continued as indicated by a negative outcome of the judgment formed at the step S48, on the other hand, the game is ended.

As described above, in accordance with the first embodiment, after composite numbers n are displayed on the client display means 2006 employed in each of the client apparatus 20, both first prime numbers p and second prime numbers q are transmitted to the server apparatus 10 as game data. If a cheating such as falsification of first prime numbers p and/or second prime numbers q is done, there will be contradictory relations among composite numbers n, the falsified first prime numbers p and the falsified second prime numbers q, that is the Eq. n=p·q ends up in failure, so that the cheating can be pointed out.

In addition, in the process to determine a pattern of dice spots, all first prime numbers p and all second prime numbers q generated by the individual authentication apparatus 22 associated with all the client apparatus 20 are used so that fairness for all the players can be assured.

Furthermore, by authenticating each of the players to do gambling by using the individual authentication apparatus 22, a restriction such as an age restriction can be imposed on the players with ease.

Moreover, if a picture showing a rolling state of the dice is displayed on the client display means 2006 employed in the client apparatus 20 in the processing carried out at the steps S40 and S42, a visual-sense effect can be desirably improved.

As described above, in the first embodiment, a first prime number p and a second prime number q, which are based on a composite number n, are generated by the PKI engine 2208. It is to be noted that the prime numbers p and q can also be generated by the CPU 2214 or the client control means 2004.

In addition, even though all bits of each of the first prime numbers p and each of the second prime numbers q can be used to determine a pattern of dice spots, only the 8 most significant bits can be used to determine a pattern of dice spots. By doing so, there is provided a merit that different patterns of dice spots can be obtained as a result of rolling the dice a plurality of times even though only a composite number n is generated.

Second Embodiment

The following description explains a second embodiment implementing a communication game system and a communication game method, which are provided by the present invention.

In the second embodiment, the communication game system and the communication game method are used to play a roulette game.

Differences between the first and second embodiments are the screen appearing on the client display means 2006 employed in the client apparatus 20 and the substance of the processing to determine a pattern of roulette slots by using first prime numbers p and second prime numbers q.

Figure 8:
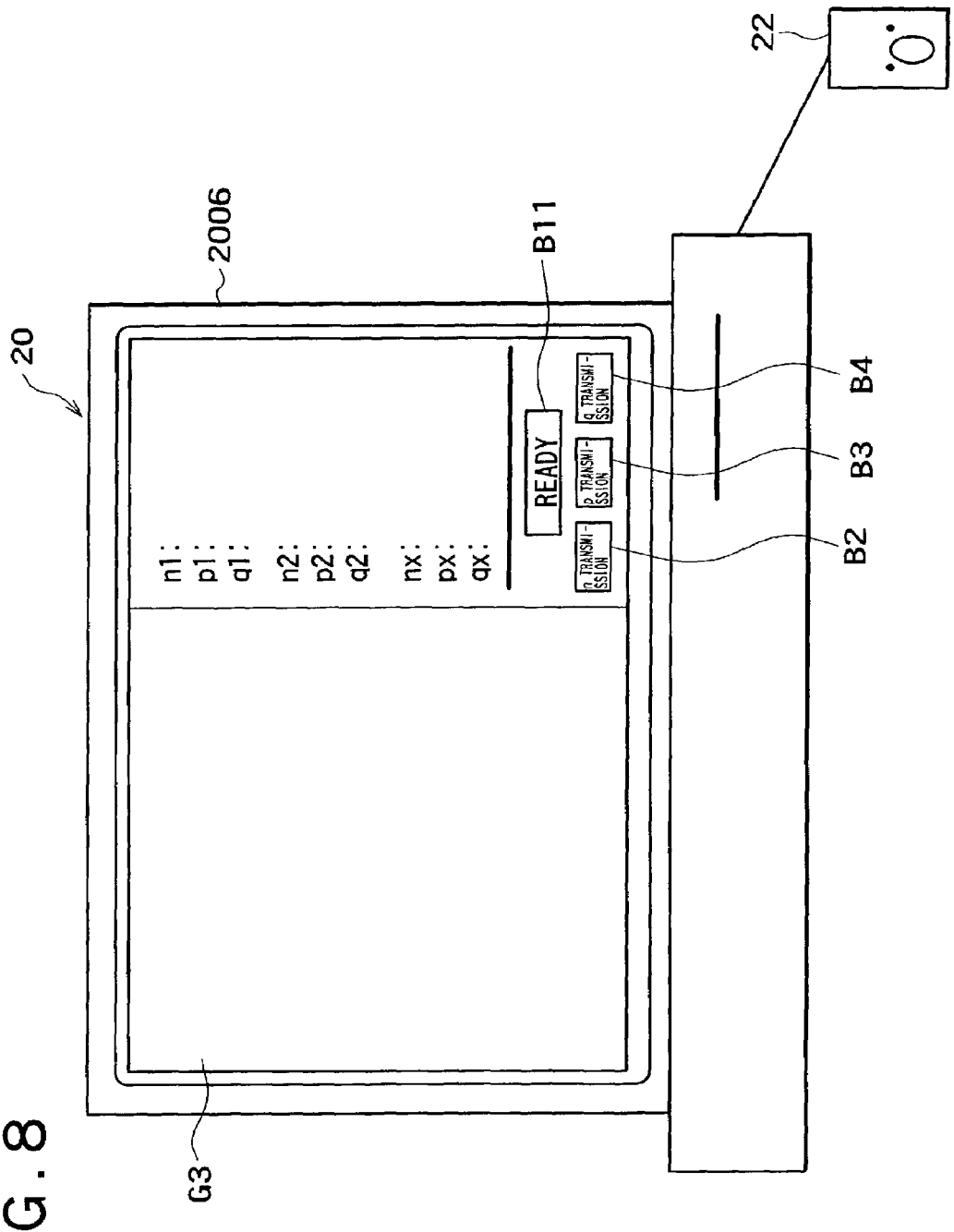
FIG. 8 is an explanatory diagram showing the screen of the display means with roulette selected.

FIG. 8 is an explanatory diagram showing the screen of the display means 2006 employed in the client apparatus 20 with roulette selected.

The display appearing on the screen shown in FIG. 8 includes a picture of a table for playing the roulette game, composite numbers n, first prime numbers p and second prime numbers q. To put it in detail, the composite numbers n are composite numbers n1 to nx generated for all the players participating in the game. By the same token, the first prime numbers p and the second prime numbers q are the players' first prime numbers p1 to px and second prime numbers q1 to qx respectively.

The display appearing on the screen also includes a ready button B11 to be operated by the player, an n transmission button B2 to be operated for transmitting a composite number n, a p transmission button B3 to be operated for transmitting a first prime number p and a q transmission button B4 to be operated for transmitting a second prime number q.

In an initial state, these buttons are set in an unoperatable state. It is to be noted that each of the buttons are displayed in different colors in accordance with whether or not the button in an operatable state (or in a ready state). For example, if a button has been put in an operatable state, the button is displayed in a green color. If a button has been put in an unoperatable state, on the other hand, the button is displayed in a red color.

Figure 9:
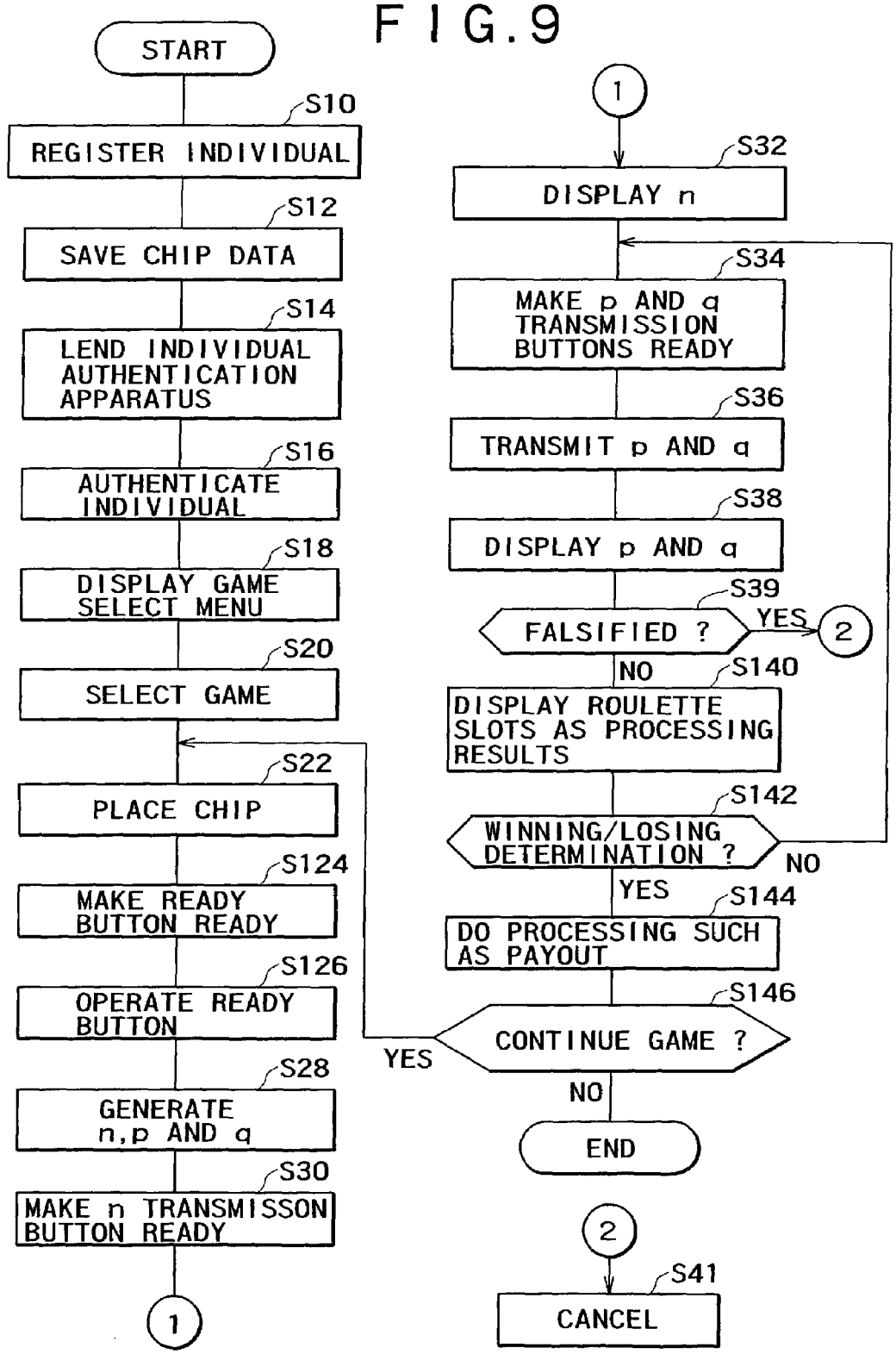
FIG. 9 is a flowchart representing operations of a second embodiment.

FIG. 9 is a flowchart representing operations of the second embodiment.

It is to be noted that, in FIG. 9, the flowchart's steps executed for carrying out operations identical with those of the flowchart shown in FIG. 5 are each denoted by the same reference numeral as the counterpart in the flowchart shown in FIG. 5, and the explanation of the identical steps is not repeated.

The steps S10 to S18 of the flowchart shown in FIG. 9 are identical with their respective counterparts in the first embodiment.

When the roulette game is selected at the step S20, the roulette game's screen G3 shown in FIG. 8 is displayed. Details of the screen G3 are not shown in the figure though.

Then, at the next step S22, the player places a chip while looking at the picture of the table. To put it in detail, the player operates the mouse of the client input means 2008 to place the picture of the chip at a desired location on the picture of the table in the so-called drag-and-drop operation. This picture is displayed on the monitor unit of each client in a real-time manner. In this embodiment, when a chip is placed, stakes data for stakes is presented by the client apparatus 20 to the server apparatus 10.

After all the players each put a chip, the dealer operates the client input means 2008 of the client server 20 used by the dealer to put the ready button B11 in a ready state for all the client apparatus 20 of the players. Information on the operation carried out by the dealer is transmitted to the server apparatus 10 by way of the Internet 30. Recognizing the information, the server control means 1004 transmits a command put the ready button B11 in a ready state to all the client apparatus 20 by way of the server communication means 1002. Receiving the command, the client control means 2004 employed in each of the client apparatus 20 used by a player changes the color of the ready button B11 of the client display means 2006 from a red color indicating an unoperatable state to a green color indicating an operatable state at the next step S124.

Then, at the next step S126, in response to the change of the color of the ready button B11, each of the players clicks the ready button B11 to drive the client control means 2004 employed in the client apparatus 20 to transmit a command to the individual authentication apparatus 22, requesting the individual authentication apparatus 22 that a public key and a secret key be generated.

Thereafter, operations carried out by the individual authentication apparatus 22 to generate composite numbers n, first prime numbers p and second prime numbers q and operations to display these numbers are carried out in the same way as those carried out at the steps S28 to S41 of the flowchart shown in FIG. 5.

Then, processing to determine a pattern of roulette slots is carried out in accordance with the following procedure.

To put it in detail, assume that the first prime numbers p and the second prime numbers q, which are received by the game means 1010 employed in the server apparatus 10 are p1 to px and q1 to qx respectively.

Then, an exclusive logical sum pq0 of the first prime numbers p1 to px and the second prime numbers q1 to qx is found by using Eq. (6) as follows:

$$pq0 = p1*p2*p3* \ldots *px*q1*q2*q3* \ldots *qx \quad (6)$$

Subsequently, the exclusive logical sum pq0 is divided by 38 and a remainder, which is obtained from the division and has a value in the range 1 to 36, is used as the pattern of roulette slots. If the remainder is 0, the remainder is treated as a roulette-eye pattern of 0. If the remainder is 37, the remainder is treated as a roulette-eye pattern of 00.

At a step S140, the game means 1010 employed in the server apparatus 10 transmits the data of the pattern of roulette slots to each of the client apparatus 20 to be displayed on the client display means 2006 employed in the client apparatus 20.

If a decision as to winning or losing of the roulette game is made as indicated by an affirmative outcome of a judgment formed at the next step S142 after the pattern of roulette slots is determined as described above, the flow of the game procedure goes on to a step S144 at which processing such as payout of stakes is carried out.

Upon completion of the processing carried out at the step S144, the flow of the game procedure goes on to a step S146 to form a judgment as to whether or not to continue the game. If the game is to be continued as indicated by an affirmative outcome of the judgment formed at the step S146, the flow of the game procedure goes back to the step S22. If the game is not to be continued as indicated by a negative outcome of the judgment formed at the step S146, on the other hand, the game is ended.

As described above, in accordance with the second embodiment, after composite numbers n are displayed on the client display means 2006 employed in each of the client apparatus 20, both first prime numbers p and second prime numbers q are transmitted to the server apparatus 10 as game data. If a cheating such as falsification of first prime numbers p and/or second prime numbers q is done, there will be contradictory relations among composite numbers n, the falsified first prime numbers p and the falsified second prime numbers q, that is the Eq. n=p·q ends up in failure, so that the cheating can be pointed out.

In addition, in the process to determine a pattern of roulette slots, all first prime numbers p and all second prime numbers q generated by the individual authentication apparatus 22 associated with all the client apparatus 20 are used so that fairness for all the players can be assured.

Furthermore, by authenticating each of the players to do gambling by using the individual authentication apparatus 22, a restriction such as an age restriction can be imposed on the players with ease.

Moreover, if a picture showing a rolling state of the roulette dice is displayed on the client display means 2006 employed in the client apparatus 20 in the processing carried out at the step S140, a visual-sense effect can be desirably improved.

In addition, even though all bits of each of the first prime numbers p and each of the second prime numbers q can be used to determine a pattern of roulette slots, only the 8 most significant bits are used to determine a pattern of roulette slots. By doing so, there is provided a merit that different patterns of roulette slots can be obtained as a result of rolling the roulette a plurality of times even though only a composite number n is generated.

Third Embodiment

The following description explains a third embodiment implementing a communication game system and a communication game method, which are provided by the present invention.

In the third embodiment, the communication game system and the communication game method are used to play a card game called blackjack.

Differences between the first and third embodiments are the screen appearing on the client display means 2006 employed in the client apparatus 20 and the substance of the processing to determine a number of a card by using first prime numbers p and second prime numbers q.

Figure 10:
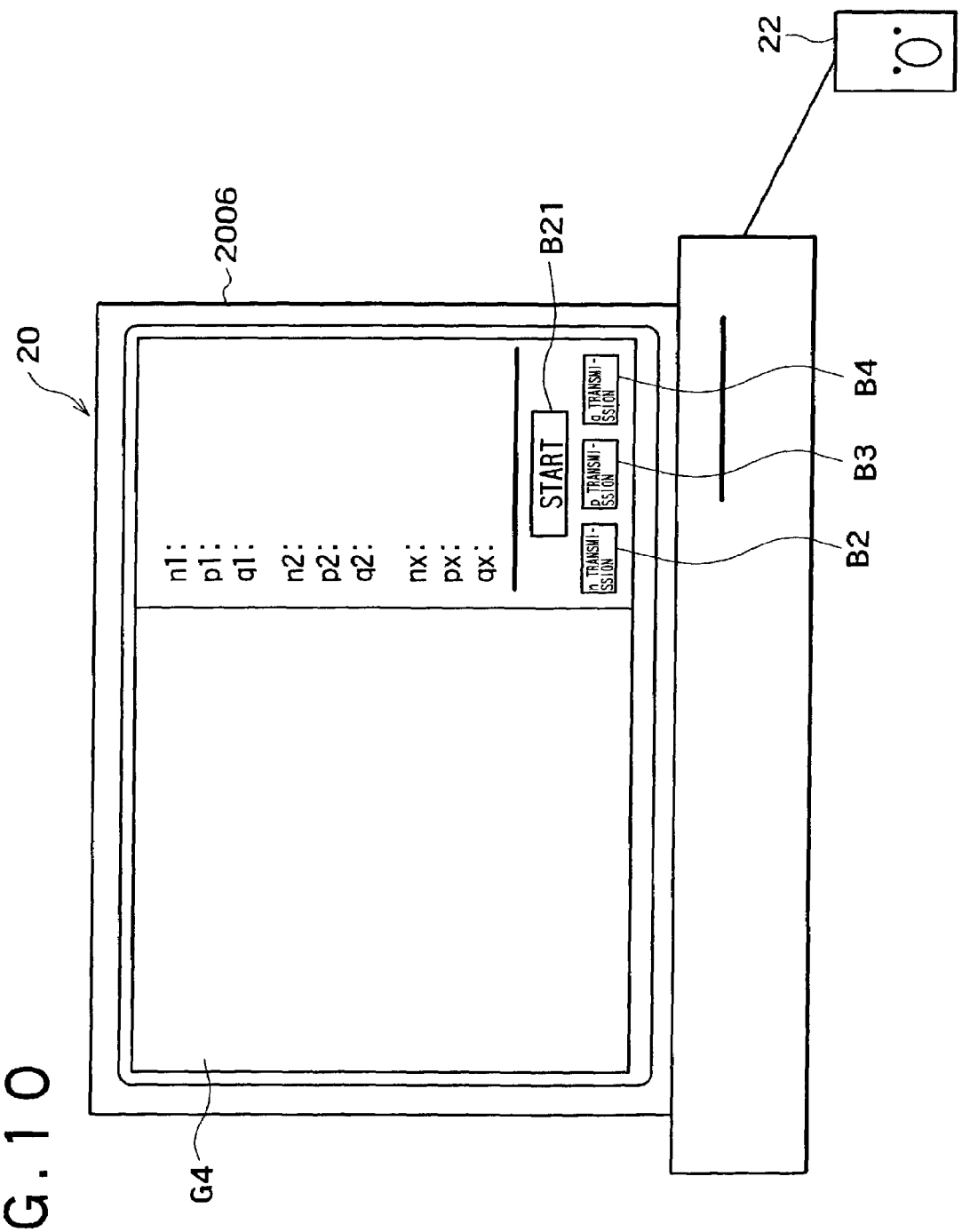
FIG. 10 is an explanatory diagram showing the screen of a display means with blackjack selected.

FIG. 10 is an explanatory diagram showing the screen of the display means 2006 employed in the client apparatus 20 with blackjack selected.

The display appearing on the screen shown in FIG. 10 includes a picture of a table for playing the blackjack game, composite numbers n, first prime numbers p and second prime numbers q. To put it in detail, the composite numbers n are composite numbers n1 to nx generated for all the players participating in the game. By the same token, the first prime numbers p and the second prime numbers q are the players' first prime numbers p1 to px and second prime numbers q1 to qx respectively.

The display appearing on the screen also includes a start button B21 to be operated by the player, an n transmission button B2 to be operated for transmitting a composite number n, a p transmission button B3 to be operated for transmitting a first prime number p and a q transmission button B4 to be operated for transmitting a second prime number q.

In an initial state, these buttons are set in an unoperatable state. It is to be noted that each of the buttons are displayed in different colors in accordance with whether or not the button is in an operatable state (or in a ready state). For example, if a button has been put in an operatable state, the button is displayed in a green color. If a button has been put in an unoperatable state, on the other hand, the button is displayed in a red color.

Figure 11:
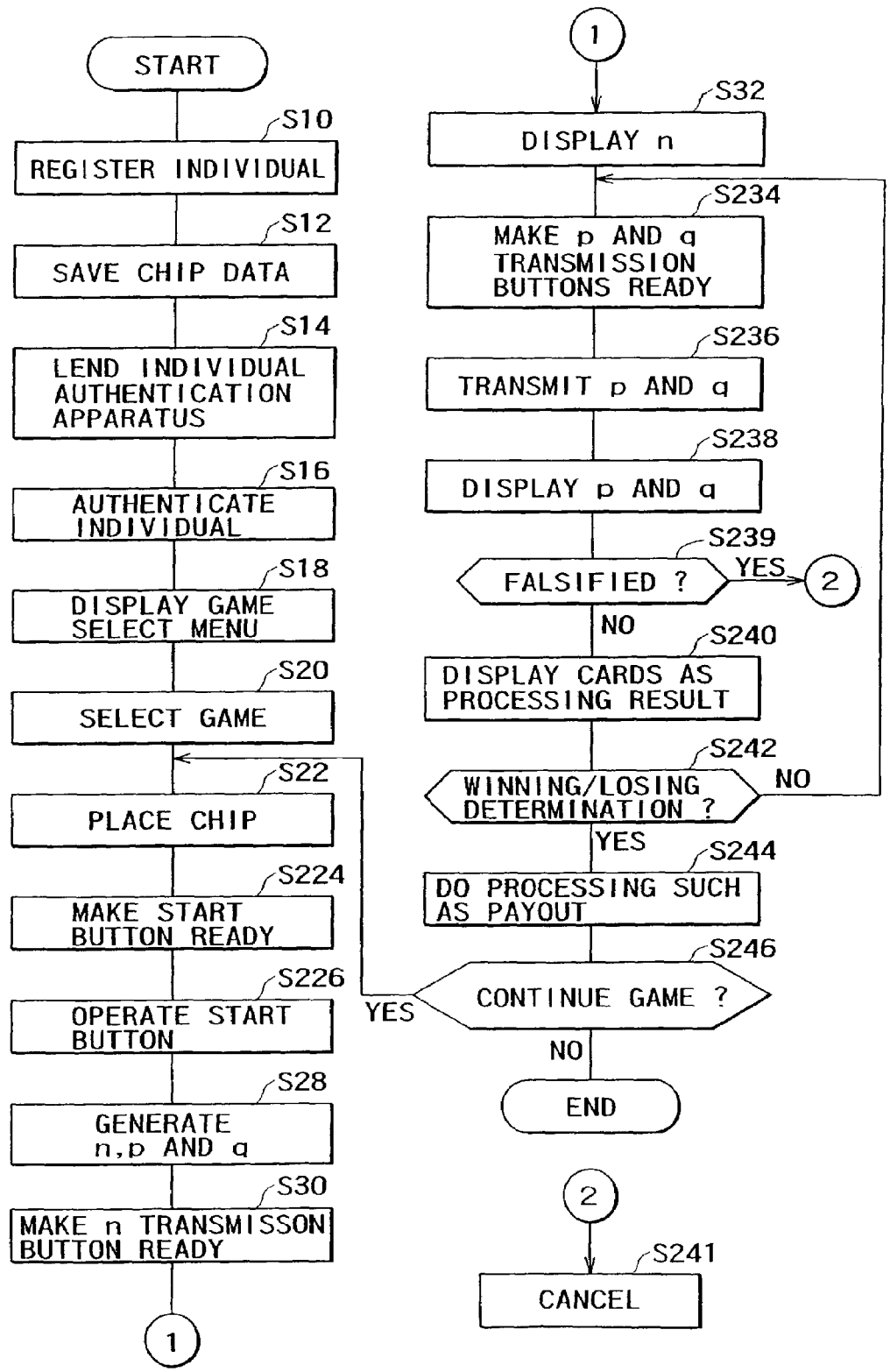
FIG. 11 is a flowchart representing operations of a third embodiment.

FIG. 11 is a flowchart representing operations of the third embodiment.

It is to be noted that, in FIG. 11, the flowchart's steps executed for carrying out operations identical with those of the flowchart shown in FIG. 5 are each denoted by the same reference numeral as the counterpart in the flowchart shown in FIG. 5, and the explanation of the identical steps is not repeated.

The steps S10 to S18 of the flowchart shown in FIG. 11 are identical with their respective counterparts in the first embodiment.

When the blackjack game is selected at the step S20, the blackjack game's screen G4 shown in FIG. 10 is displayed. Details of the screen G4 are not shown in the figure though.

Then, at the next step S22, the player places a chip while looking at the picture of the table. To put it in detail, the player operates the mouse of the client input means 2008 to place the picture of the chip at a desired location on the picture of the table in the so-called drag-and-drop operation. This picture is displayed on the monitor unit of each client in a real-time manner. It is to be noted that, when a chip is placed, stakes data for stakes is presented by the client apparatus 20 to the server apparatus 10.

After all the players each put a chip, the dealer operates the client input means 2008 of the client server 20 used by the dealer to put the start button B21 in a ready state for all the client apparatus 20 of the players. Information on the operation carried out by the dealer is transmitted to the server apparatus 10 by way of the Internet 30. Recognizing the information, the server control means 1004 transmits a command to put the start button B21 in a ready state to all the client apparatus 20 by way of the server communication means 1002. Receiving the command, the client control means 2004 employed in each of the client apparatus 20 used by a player changes the color of the start button B21 of the client display means 2006 from a red color indicating an unoperatable state to a green color indicating an operatable state at the next step S224.

Then, at the next step S226, in response to the change of the color of the start button B21, each of the players clicks the start button B21 to drive the client control means 2004 employed in the client apparatus 20 to transmit a command to the individual authentication apparatus 22, requesting the individual authentication apparatus 22 that a public key and a secret key be generated.

Thereafter, operations carried out by the individual authentication apparatus 22 to generate composite numbers n, first prime numbers p and second prime numbers q and operations to display these numbers are carried out in the same way as those carried out at the steps S28 to S32 of the flowchart shown in FIG. 5. It is to be noted that, in this embodiment, the first prime number p and the second prime number q are each a 512-bit number.

Then, after transmitting all the composite numbers n back to all the client apparatus 20, the game means 1010 employed in the server apparatus 10 transmits a command to all the client apparatus 20 to request the client apparatus 20 that the buttons for transmitting a first prime number p and a second prime number q be each put in an operatable state.

In accordance with this command, the client control means 2004 puts each of the p transmission button B3 and the q transmission button B4 in an operatable state at the next step S234. For example, the client control means 2004 changes the color of each of the p transmission button B3 and the q transmission button B4 from a red color to a green one.

Subsequently, at the next step S236, each of the players operates both the p transmission button B3 and the q transmission button B4 to transmit respectively the first prime number p and the second prime number q, which were received by the client apparatus 20 from the individual authentication apparatus 22, to the server apparatus 10 as game data.

Assume that 4 decks of cards are used in this embodiment. In this case, the total number of cards is 52×4=208. Thus, at least 208 different values are required for identifying each card's picture and number. For this reason, the first prime number p and the second prime number q, which are required in 1 play session, each need to have a length of 8 bits or have a value in the range 0 to 255 if expressed in the decimal format.

Thus, only the 8 most significant bits of the first prime number p and the second prime number q need to be transmitted each time a card is determined in a session of the game card.

Note that, in fact, it is necessary to delete the LSB (Least Significant Bit) of each of the first prime number p and the second prime number q. This is because the generated 512 bits of each of the first prime number p and the second prime number q always form an odd number having a least significant bit (LSB) of 1. If the least significant bit is also transmitted, a result of processing to determine the number of a card as will be described later will be inevitably dependent on the number of players. Thus, the LSB (Least Significant Bit) of each of the first prime number p and the second prime number q is deleted in order to solve this problem.

The number of less significant bits starting with the LSB (Least Significant Bit) to be eliminated from the first prime number p and the second prime number q is arbitrary. For example, it is possible to eliminate the less significant bits in the lower half of the 512 bits composing the first prime number p and the second prime number q.

Then, the server apparatus 10 receives the first prime numbers p and the second prime numbers q from all the client apparatus 20. The game means 1010 employed in the server apparatus 10 then transmits back all the received first prime numbers p and all the received second prime numbers q to each of the client apparatus 20. Thus, the client display means 2006 employed in the client apparatus 20 is capable of displaying all the first prime numbers p and all the second prime numbers q at the next step S238.

Accordingly, each of the players is capable of visually recognizing its own first and second prime numbers p and q as well as the first and second prime numbers p and q of the other players.

Then, at the next step S239, the client control means 2004 in each of the client apparatus 20 collates each of the composite numbers n with the first and second prime numbers p and q, which are associated with the composite number n, to form a judgment as to whether or not the first and/or second prime numbers p and/or q have been falsified. All the composite numbers n, all the first prime numbers p and all the second prime numbers q have been received at the step S238 by the client communication means 2002 of the client apparatus 20. If the outcome of the judgment indicates that none of the first and second prime numbers p and q have been falsified, the flow of the routine goes on to the next step. If the outcome of the judgment indicates that the first and/or second prime numbers p and/or q have been falsified, on the other hand, the server apparatus 10 is notified of the falsification. In this case, the server apparatus 10 gives a command to all the client apparatus 20 to discontinue the game at a step S241.

Then, the game means 1010 employed in the server apparatus 10 determines the number of a card on the basis of the received first prime numbers p and the received second prime numbers q.

Subsequently, processing to determine the number of a card is carried out in accordance with the following procedure.

To put it in detail, assume that the first prime numbers p and the second prime numbers q, which are received by the game means 1010 employed in the server apparatus 10 are p1 to px and q1 to qx respectively.

Then, an exclusive logical sum p0 of the first prime numbers p1 to px is found by using Eq. (7) as follows:

$$p0 = p1 * p2 * p3 * \ldots * px \quad (7)$$

By the same token, an exclusive logical sum q0 of the second prime numbers q1 to qx is found by using Eq. (8) as follows:

$$q0 = q1 * q2 * q3 * \ldots * qx \quad (8)$$

Subsequently, the dealer distributes a predetermined number of cards to each player who operates the client apparatus 20 in accordance with rules of the blackjack game. The distributed cards are identified by the exclusive logical sums p0 and q0. Since the rules themselves are not directly relevant to essentials of the present invention, explanation of the rules is omitted.

To put it in detail, at a step S240, the game means 1010 employed in the server apparatus 10 transmits data representing each card's number and picture to each of the client apparatus 20. The client display means 2006 employed in each of the client apparatus 20 then displays each card's number and picture, which are based on the data.

If a decision as to winning or losing of the blackjack game is made as indicated by an affirmative outcome of a judgment formed at the next step S242 after the number and the picture of each card are determined as described above, the flow of the game procedure goes on to a step S244 at which processing such as payout of stakes is carried out.

If a decision as to winning or losing of the blackjack game is not made as indicated by a negative outcome of the judgment formed at the step S242, on the other hand, the flow of the game procedure goes back to the step S234.

Upon completion of the processing carried out at the step S244, the flow of the game procedure goes on to a step S246 to form a judgment as to whether or not to continue the game. If the game is to be continued as indicated by an affirmative outcome of the judgment the judgment formed at the step S246, the flow of the game procedure goes back to the step S22. If the game is not to be continued as indicated by a negative outcome of the judgment formed at the step S246, on the other hand, the game is ended.

As described above, in accordance with the third embodiment, after composite numbers n are displayed on the client display means 2006 employed in each of the client apparatus 20, both first prime numbers p and second prime numbers q are transmitted to the server apparatus 10 as game data. If a cheating such as falsification of first prime numbers p and/or second prime numbers q is done, there will be contradictory relations among composite numbers n, the falsified first prime numbers p and the falsified second prime numbers q so that the cheating can be pointed out. That is, it is impossible to establish n=p·q.

To put it in more detail, all composite numbers n appear on the client display means 2006 employed in each of the client apparatus 20 to be followed by all first prime numbers p and all second prime numbers q.

In addition, in the process to determine each card's number and picture, all first prime numbers p and all second prime numbers q generated by the individual authentication apparatus 22 associated with all the client apparatus 20 are used so that fairness for all the players can be assured.

Furthermore, by authenticating each of the players to do gambling by using the individual authentication apparatus 22, a restriction such as an age restriction can be imposed on the players with ease.

Moreover, if a picture showing, among others, cards' state of being shuffled is displayed on the client display means 2006 employed in the client apparatus 20 in the processing carried out at the step S240, a visual-sense effect can be desirably improved.

It is to be noted that the scope of the present invention is not limited to the craps, roulette and blackjack games. For example, the present invention can also be applied to a poker game by using cards as will be explained later in the description of a fifth embodiment.

In addition, the scope of the present invention is not limited to games using dices or cards. That is to say, the present invention can be applied to any game as long as the first and second prime numbers p and q described above are used as game data.

Furthermore, by increasing the number of bits composing each of the first and second prime numbers p and q, the prime numbers p and q can be made difficult to find from a composite number n so that there is provided a merit of an ability to prevent a cheating. If the number of bits is set at at least 500, for example, practically, the first prime numbers p and q can be said to be undecodable.

Moreover, it is desirable to use a VPN (Virtual Private Network) capable of assuring encrypted communication as a communication network for connecting the server apparatus 10 to each of the client apparatus 20. As a communication network for connecting the server apparatus 10 to each of the client apparatus 20, any network other than the Internet can also be used.

It is to be noted that, in the games provided by the first to third embodiments, the dealer merely carries forward the games and is not capable of participating in the betting by paying stakes. It is needless to say that the present invention can also be applied to a game in which the dealer is allowed to participate in the betting by paying stakes.

In addition, if a digital signature with a time stamp is put on a composite number transmitted by a client apparatus 20 to the server apparatus 10, it is possible to identify the originator of the composite number and a time at which the composite number is transmitted.

Thus, it is possible to prevent the transmission of a composite number itself from being denied by the sender and the transmission date and time of the composite number from being falsified. As a result, there is a merit of a capability of preventing cheatings.

Fourth Embodiment

Next, a fourth embodiment is explained.

A difference between the fourth embodiment and the first to third embodiments is the operation to generate data for the game.

Much like the first to third embodiments, in the fourth embodiment, the client apparatus 20 transmit a command to the individual authentication apparatus 22, requesting the individual authentication apparatus 22 to generate secret keys.

In accordance with the command, the PKI engine 2208 serving as a game-data generation means generates an n-bit random number M. In the case of the fourth embodiment, the random number M, which can be a prime or non-prime number, is expressed as follows.

$$M = a_1 a_2 a_3 a_4 a_5 a_6 a_7 a_8 \ldots a_n \quad (9)$$

where symbols $a_1$ to $a_n$ each denote a bit.

The PKI engine 2208 uses the random number M as an independent variable of a hash function for finding hash data H as the hash function's dependent variable for the independent variable as follows:

$$H = \text{Hash}(M) \quad (10)$$

From the hash data H, a random number M for the data H cannot be found reversibly. The random data H is a number having fewer bits than the random number M.

A digital signature with a time stamp is put on the hash data H.

Figure 12:
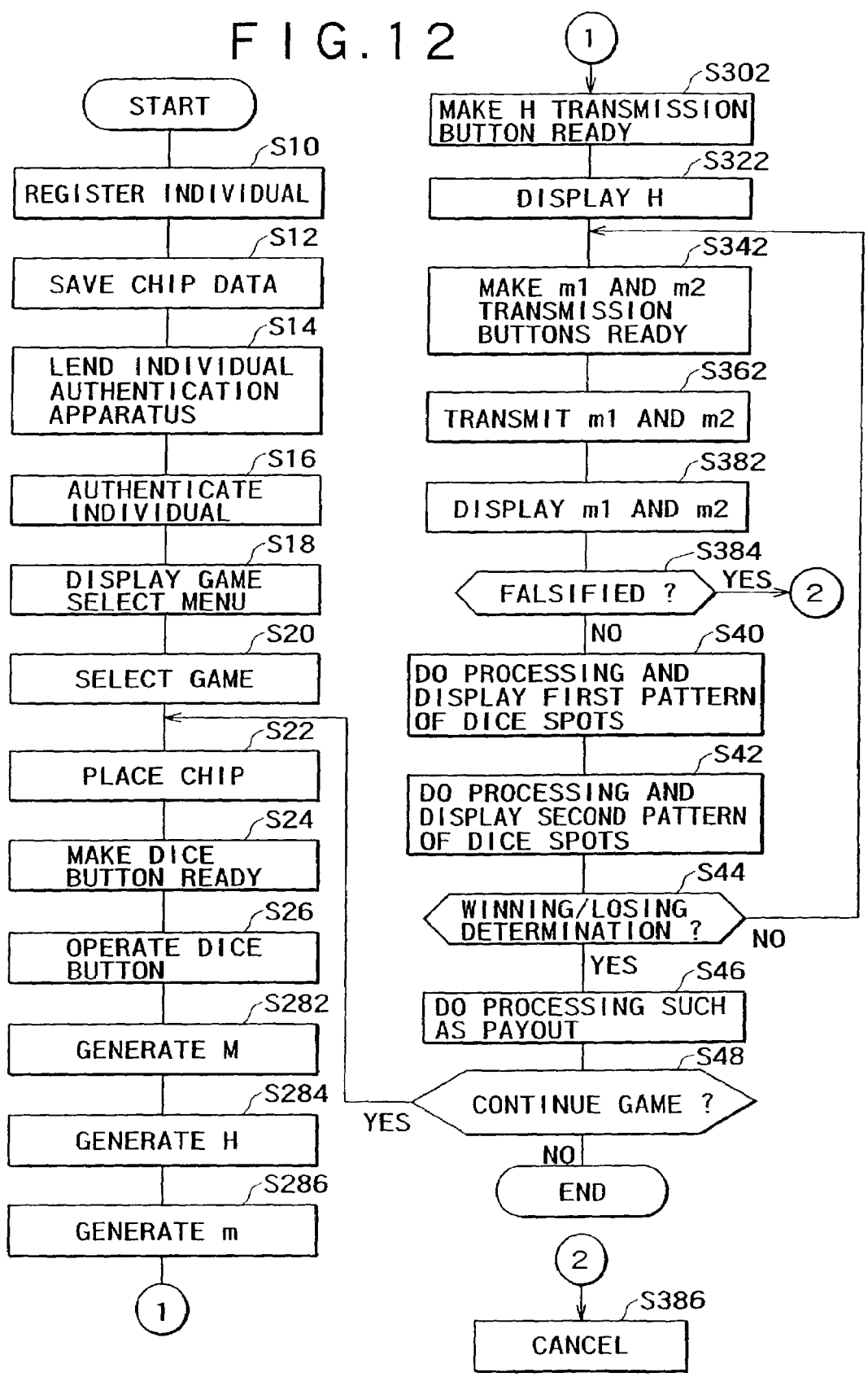
FIG. 12 is a flowchart representing operations of a fourth embodiment.

By referring to a flowchart shown in FIG. 12, the following description explains a craps game adopting a method to generate game data like the one described earlier.

In FIG. 12, the flowchart's steps executed for carrying out operations identical with those of the flowchart shown in FIG. 5 are each denoted by the same reference numeral as the counterpart in the flowchart shown in FIG. 5, and the explanation of the identical steps is not repeated.

It is to be noted that, since the configuration of the communication game system implemented by the fourth embodiment is the same as the first embodiment, the operations of the fourth embodiment are explained by referring to FIGS. 1 to 4.

First of all, since steps S10 to S18 of the flowchart shown in FIG. 12 are identical with their respective counterparts in the flowchart shown in FIG. 5, the explanation of the steps S10 to S18 is not repeated.

Figure 13:
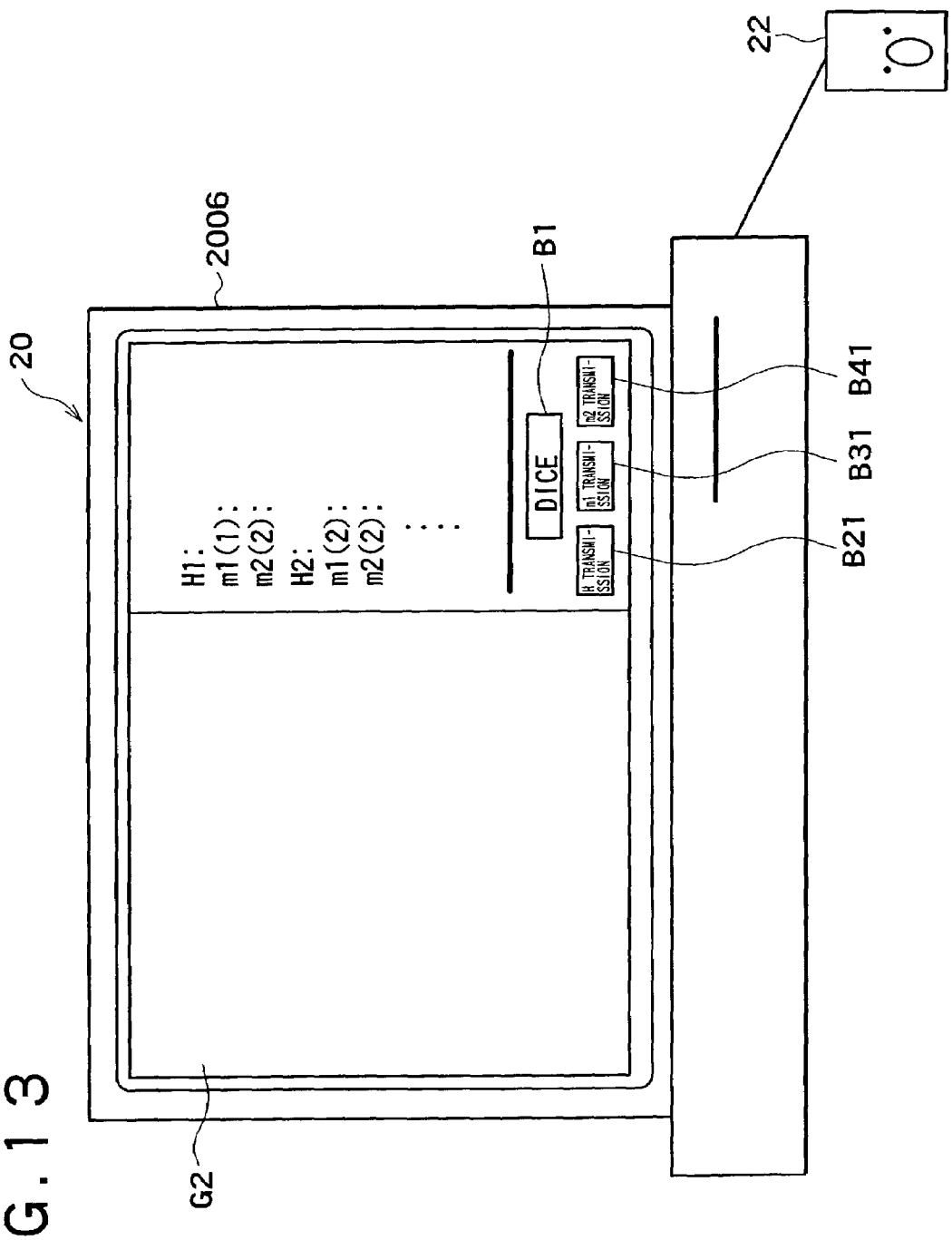
FIG. 13 is an explanatory diagram showing the screen of the display means with craps selected.

When the execution key on the keyboard of the client input means 2008 is pressed at the next step S20, a screen for playing the craps game is displayed as shown in FIG. 13.

The display appearing on the screen includes a picture G2 of a table for playing the craps game, hash data H, game data m1 and game data m2. Details of the picture G2 are omitted. To put it in detail, the hash data H are pieces of H data H1 to Hn generated for all the players participating in the game. By the same token, the game data m1 and the game data m2 are the players' game data m1 (1) to m1 (n) and game data m2 (1) to m2 (n) respectively. The hash data H, the game data m1 and the game data m2 than those for this player are received from other client apparatus 20 of all other players participating in the game.

The display appearing on the screen also includes a dice button B1 for shaking a dice, an H transmission button B21 to be operated for transmitting hash data H, an m1 transmission button B31 to be operated for transmitting game data m1 and an m2 transmission button B41 to be operated for transmitting game data m2.

In an initial state, these buttons are set in an unoperatable state. It is to be noted that each of the buttons are displayed in different colors in accordance with whether or not the button in an operatable state (or in a ready state). For example, if a button has been put in an operatable state, the button is displayed in a green color. If a button has been put in an unoperatable state, on the other hand, the button is displayed in a red color.

Operations carried out at the steps 22 to 24 are identical with their respective counterparts in the first embodiment.

When the dice button is operated at a step S26, the individual authentication apparatus 22 associated with apparatus 20 generates a random number M at the next step S282 and hash data H for the random number M at the next step S284 by carrying out the operations described above.

Then, at the next step S286, the random number M is divided into portions m1, m2 and m3 each having a predetermined length. That is to say, each of the portions m1 to m3 includes a predetermined number of bits such as typically eight bits. The portions m1 to m3 are each used as game data m.

As described earlier, assume that the random number M is expressed as follows:

$$M = a_1 a_2 a_3 a_4 a_5 a_6 a_7 a_8 \ldots a_n \quad (9)$$

In this case, the portions m1 to m3 are expressed by Eqs. (11), (12) and (13) respectively as follows:

$$m1 = a_1 a_2 a_3 a_4 a_5 a_6 a_7 a_8 \quad (11)$$

$$m2 = a_9 a_{10} a_{11} a_{12} a_{13} a_{14} a_{15} \quad (12)$$

$$m3 = a_{16} a_{17} a_{18} a_{19} a_{20} a_{21} a_{22} a_{23} \quad (13)$$

Then, at the next step S302, the client control means 2004 first of all puts the H transmission button B21 in an operatable state. Typically, the client control means 2004 changes the color of the H transmission button B21 from the red color to a green one.

When a player operates the H transmission button B21, in response to the change of the color of the H transmission button B21, the hash data H for the player is transmitted to the server apparatus 10. The server apparatus 10 receives hash data H from each of the client apparatus 20. Then, the game means 1010 employed in the server apparatus 10 transmits back all the received pieces of hash data H to each of the client apparatus 20. Thus, all the pieces of data H appear on the display means 2006 employed in each of the client apparatus 20 at the next step S322.

As a result, each of the players is capable of visually recognizing its own hash data H and the other pieces of hash data H for the other players.

After transmitting all the pieces of hash data H to each of the client apparatus 20, the game means 1010 employed in the server apparatus 10 transmits a command to all the client apparatus 20 to request the client apparatus 20 that the buttons for transmitting game data m1 and game data m2 be each put in an operatable state.

In accordance with this command, the client control means 2004 puts each of the m1 transmission button B31 and the m2 transmission button B41 in an operatable state at the next step S342. For example, the client control means 2004 changes the color of each of the ml transmission button B31 and the m2 transmission button B41 from a red color to a green one.

Subsequently, at the next step S362, each of the players operates both the m1 transmission button B31 and the m2 transmission button B41 to transmit respectively the game data m1 and the game data m2, which were received by the client apparatus 20 from the individual authentication apparatus 22, to the server apparatus 10 as game data. Thus, the game means 1010 employed in the server apparatus 10 receives pieces of game data m1 (1) to m1 (x) and m2 (1) to m2 (x) from all the client apparatus 20. Then, the game means 1010 employed in the server apparatus 10 transmits back all the received pieces of game data m1 (1) to m1 (x) and m2 (1) to m2 (x) to each of the client apparatus 20. Thus, all the pieces of game data m1 (1) to m1 (x) and m2 (1) to m2 (x) appear on the display means 2006 employed in each of the client apparatus 20 at the next step S382.

As a result, each of the players is capable of visually recognizing its own piece of game data m1 and m2 and the other pieces of game data m1 and m2 for the other players.

Then, at the next step S384, the client control means 2004 in each of the client apparatus 20 collates each piece of hash data H with a piece of first game data m1 and a piece of second game data m2, which are associated with the piece of hash data H, to form a judgment as to whether or not the piece of first game data m1 and/or the piece of game data m2 have been falsified. All the pieces of hash data H, all the pieces of game data m1 and all the pieces of game data m2 have been received at the step S382 by the client communication means 2002 of the client apparatus 20. If the outcome of the judgment indicates that none of the piece of first game data m1 and the piece of second game data m2 have been falsified, the flow of the routine goes on to the next step. If the outcome of the judgment indicates that the piece of first game data m1 and/or the piece of second game data m2 have been falsified, on the other hand, the server apparatus 10 is notified of the falsification. In this case, the server apparatus 10 gives a command to all the client apparatus 20 to discontinue the game at a step S386.

Then, the game means 1010 employed in the server apparatus 10 determines 2 patterns of dice spots, that is, two numbers in the range one to six, on the basis of the received game data.

To put it in detail, assume that the game data m1 received by the game means 1010 employed in the server apparatus 10 is game data m1 (1) to m1 (x) and m2 (1) to m2 (x).

Then, an exclusive logical sum m1 (0) of the pieces of game data m1 (1) to m1 (x) is found by using Eq. (14) as follows:

$$m1(0)=m1(1)*m1(2)*m1(3)* \ldots *m1(x) \qquad (14)$$

Subsequently, the exclusive logical sum m1 (0) is divided by six and a remainder obtained from the division is used as the first pattern of dice spots. If the remainder is zero, the remainder is treated as the pattern of six dice spots.

At a step S40, the game means 1010 employed in the server apparatus 10 transmits the data of the first pattern of dice spots to each of the client apparatus 20 to be displayed on the client display means 2006 employed in the client apparatus 20.

By the same token, an exclusive logical sum m2 (0) of the pieces of game data m2 (1) to m2 (x) is found by using Eq. (15) as follows:

$$m2(0)=m2(1)*m2(2)*m2(3)* \ldots *m2(x) \qquad (15)$$

Subsequently, the exclusive logical sum m2 (0) is divided by six and a remainder obtained from the division is used as the second pattern of dice spots. If the remainder is zero, the remainder is treated as the pattern of six dice spots.

At a step S42, the game means 1010 employed in the server apparatus 10 transmits the data of the second pattern of dice spots to each of the client apparatus 20 to be displayed on the client display means 2006 employed in the client apparatus 20.

If a decision as to winning or losing of the craps game is made as indicated by an affirmative outcome of a judgment formed at the next step S44 after the two patterns of dice spots are determined as described above, the flow of the game procedure goes on to a step S46 at which processing such as payout of stakes is carried out.

If a decision as to winning or losing of the craps game is not made as indicated by a negative outcome of the judgment formed at the step S44, on the other hand, the flow of the game procedure goes back to the step S342.

Upon completion of the processing carried out at the step S46, the flow of the game procedure goes on to a step S48 to form a judgment as to whether or not to continue the game. If the game is to be continued as indicated by an affirmative outcome of the judgment formed at the step S48, the flow of the game procedure goes back to the step S22. If the game is not to be continued as indicated by a negative outcome of the judgment formed at the step S48, on the other hand, the game is ended.

As described above, in accordance with the fourth embodiment, after pieces of hash data H are displayed on the client display means 2006 employed in each of the client apparatus 20, both game data m1 and game data m2 are transmitted to the server apparatus 10 as game data. If a cheating such as falsification of game data m1 and game data m2 is done, there will be contradictory relations among the hash data H, the falsified game data m1 and the falsified game data m2 so that the cheating can be pointed out.

In comparison with the first to third embodiments, in the case of the fourth embodiment, in the process to generate game data from a random number M, the processing to select prime numbers is not required. Thus, the process time can be reduced by the time required to carry out the processing to select prime numbers, resulting in a merit of a higher process speed.

Also in the case of the fourth embodiment, by increasing the number of bits composing the random number M, it is possible to make game data more difficult to derive from the hash data. If the number of bits composing the random number M is set at at least 500, for example, practically, it becomes impossible to infer game data.

In addition, if a digital signature with a time stamp is put on the hash data H, it is possible to identify the originator of the hash data H and a time at which the hash data H is transmitted.

Thus, it is possible to prevent the transmission of hash data H itself from being denied by the sender and the transmission date and time of the hash data from being falsified. As a result, the fourth embodiment is advantageous in prevention of cheatings.

In addition, in the process to determine a pattern of dice spots, all pieces of game data m1 and all pieces of game data m2, which are generated by the individual authentication apparatus 22 associated with all the client apparatus 20, are used so that fairness for all the players can be assured.

Furthermore, by authenticating each of the players to do gambling by using the individual authentication apparatus 22, a restriction such as an age restriction can be imposed on the players with ease.

Moreover, if a picture showing a rolling state of the dice is displayed on the client display means 2006 employed in the client apparatus 20 in the processing carried out at the steps S40 and S42, a visual-sense effect can be desirably improved.

It is to be noted that, in this embodiment, starting from the most significant bit of the random number M, the random number M is divided into portions m1, m2, m3 and so on each consisting of a predetermined number of bits. Only the portions m1 and m2 are used as game data in one session of the game.

However, the subsequent portions m3, m4 and so on following the first two portions m1 and m2 can also be used as game data in the second and subsequent sessions of the game, that is, as game data for generating a pattern of dice spots in the second and subsequent sessions of the game.

In addition, the fourth embodiment applies the present invention to a craps game in which the number of dice spots is in the range one to six as described above. By changing the range of numbers required as game data, however, the present invention can also be applied to roulette and blackjack as is the case with the second and third embodiments as well as to other games.

In general, if k is set as the upper limit of a range of numbers required as game data, that is, if numbers in the range one to k are required as game data where k is any arbitrary positive integer, the exclusive logical sum of the game data is divided by k to result in a remainder having a value in the range 0 to (k−1).

As described above, portions obtained as a result of division of the random number M starting from the most significant bit of the random number M into portions each consisting of a predetermined number of bits can also be used in the second and subsequent sessions of the game. However, the fact that such portions can also be used in the second and subsequent sessions of the game has nothing to do with the type of the game. If the game is a card game, the portions can be used for determining the number and the pattern of each card in the second and subsequent sessions of the game. If the game is roulette, on the other hand, the portions can be used for determining a pattern of roulette slots in the second and subsequent sessions of the game.

As described above, in the fourth embodiment, the PKI engine 2208 carries out the operation to generate hash data H based on a random number M and the operation to put a digital signature with a time stamp on the hash data H. It is to be noted that these two operations can also be carried out by the CPU 2214 or the client control means 2004.

Fifth Embodiment

The following description explains a fifth embodiment implementing the communication game system, communication game method, server, client, and program which are provided by the present invention.

In the embodiment described below, the game played by using the communication game system and the communication game method is a poker game using cards.

It is to be noted that, in a poker game, a plurality of cards is taken from a deck of cards and passed to each player participating in the game. The deck of cards consists of cards, which are each laid face down. The cards are passed to each player with each card laid face down as it is. The numbers and the patterns of the cards passed to each player determine the strength of a combination of the cards and determine whether the player holding the cards is a winner or a loser of the game.

Figure 14:
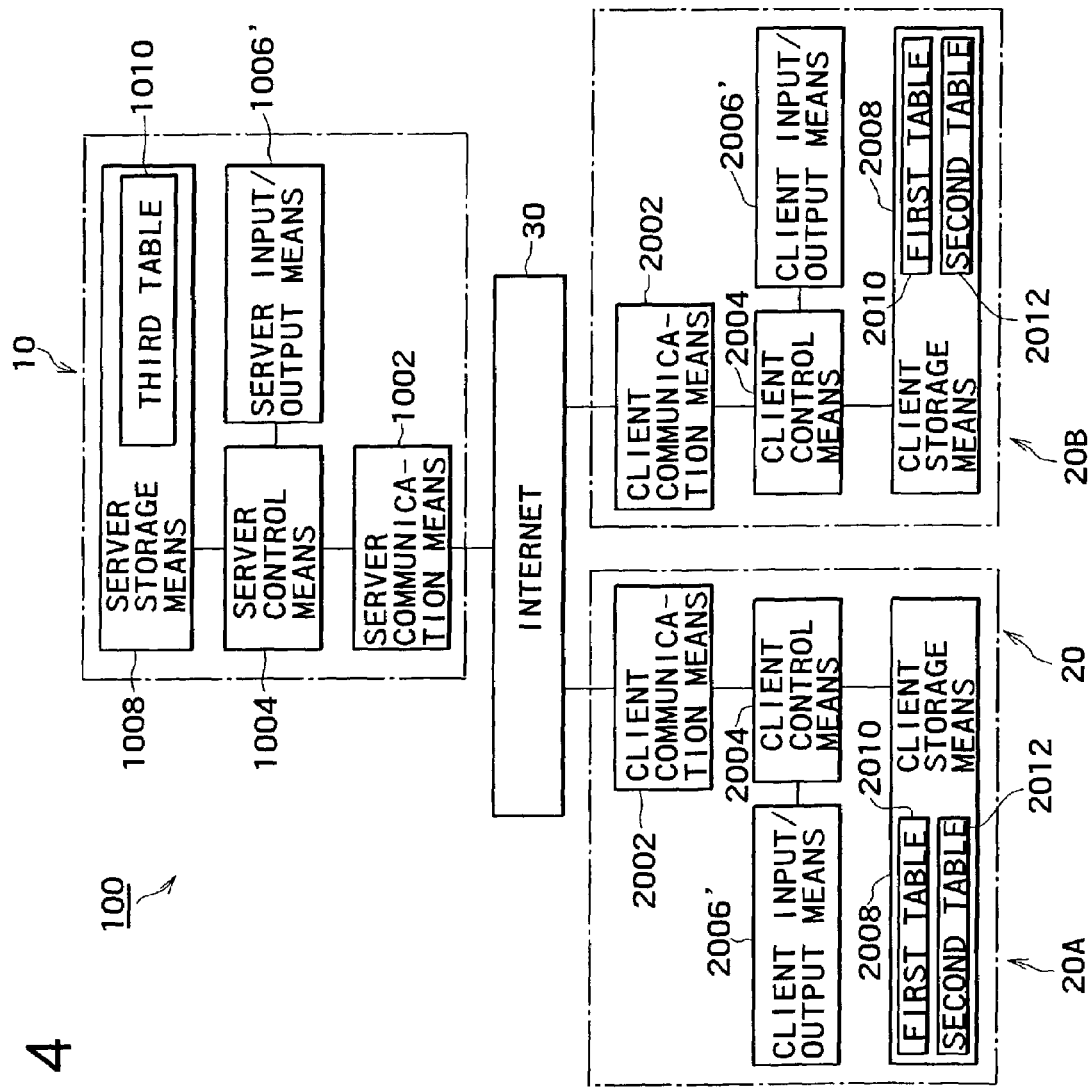
FIG. 14 a block diagram showing the configurations of a server apparatus and a client apparatus, which are implemented by a fifth embodiment of the present invention, in a simple and plain manner.

FIG. 14 is a block diagram showing the configuration of the communication game system in a simple and plain manner.

The communication game system 100 comprises a server apparatus 10 (server), a plurality of client apparatus 20 (20A and 20B) (clients) and the Internet 30 (communication network), which is used for connecting the server apparatus 10 to the client apparatus 20 so that the client apparatus 20 are capable of exchanging information with each other by way of the server apparatus 10.

In order to simplify explanation, in the following description, it is assumed that there are only 2 client apparatus, namely, client apparatus 20A and 20B.

The server apparatus 10 comprises, among other components, a server communication means 1002, a server control means 1004, a server input/output means 1006' and a server storage means 1008.

The server communication means 1002 has a configuration for carrying out communications with the client apparatus 20 through the Internet 30.

The server control means 1004 controls the other components and implements the game by having a CPU execute game software stored in the server storage means 1008. It is to be noted that, being not directly relevant to essentials of the present invention, details of the game are not explained. Only the game's details required in later explanation of the operations of the embodiment are described briefly.

The server input/output means 1006' has a display unit and an input unit, which are not shown in the figure. The display unit is typically a monitor unit having a configuration for displaying a picture required in playing the game on a screen. The input unit has a configuration comprising components including a mouse and a keyboard, which are operated for entering information required in playing the game.

The server storage means 1008 is used for storing software of the game and a third table 1010 showing identification numbers of cards in a tabulated form as will be described later.

The client apparatus 20 is typically an individual computer having a client communication means 2002, a client control means 2004, a client input/output means 2006' and a client storage means 2008.

The client communication means 2002 has a configuration for carrying out communications with the server apparatus 10 through the Internet 30.

The client control means 2004 controls the other components.

The client input/output means 2006' has a display unit and an input unit, which are not shown in the figure. The display unit is a monitor unit having a configuration for displaying pictures including pictures representing the numbers or patterns of the cards required in playing a game on a screen. The input unit has a configuration comprising components including a mouse and a keyboard, which are operated for entering information required in playing the game.

The client storage means 2008 is used for storing software for operating the client control means 2004 and a first table 2010 as well as a second table 2012, which will be described later.

Figure 15:
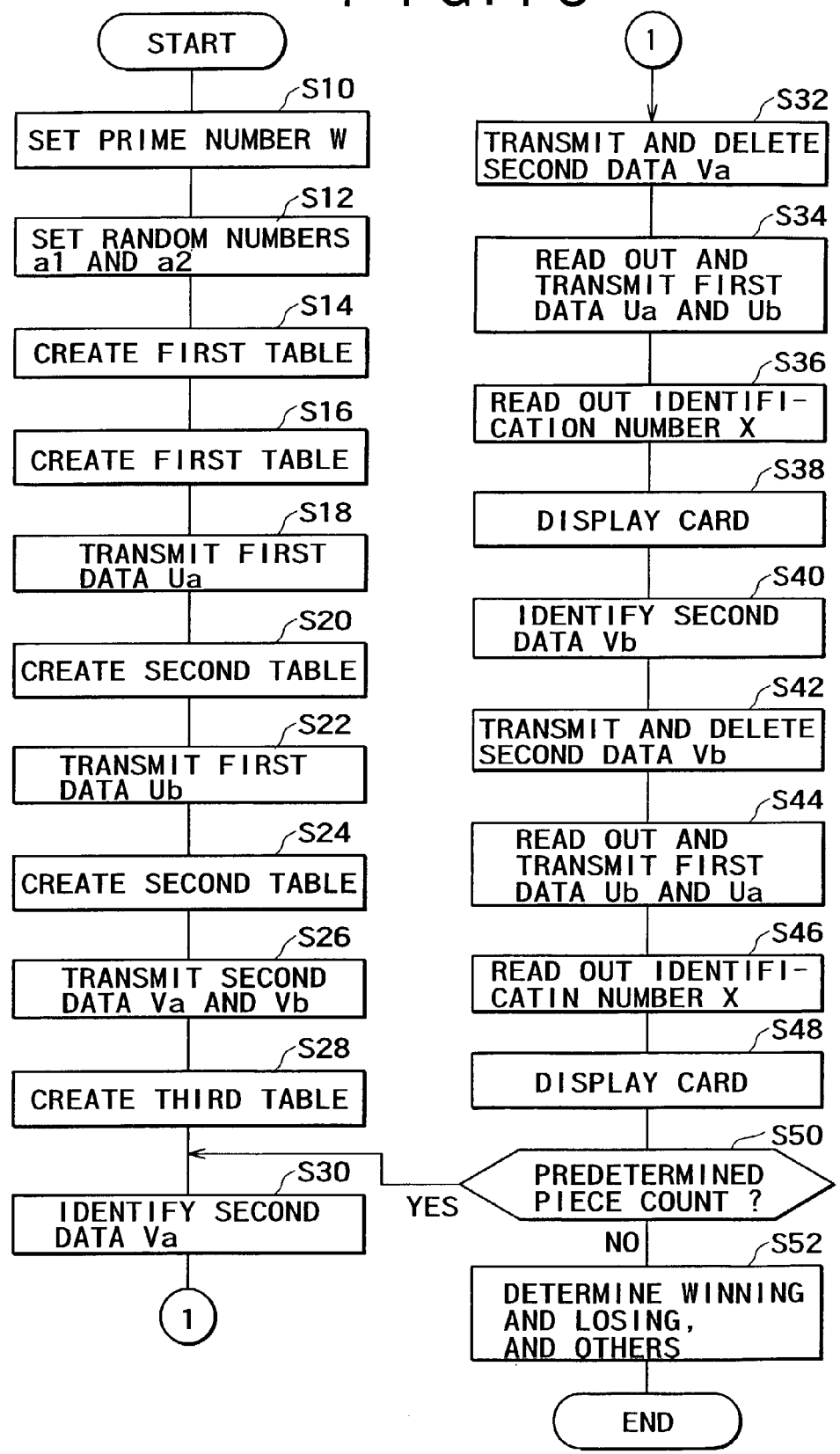
FIG. 15 is a flowchart representing operations of a server apparatus and a client apparatus, which are implemented by the fifth embodiment.

By referring to a flowchart shown in FIG. 15, the following description explains operations carried out to play the game.

It is to be noted that the following description explains a case in which the game is played by 2 players, namely, players A and B. Players A and B use the client apparatus 20A and 20B respectively. That is to say, players A and B operate the client apparatus 20A and 20B respectively to play the game.

It is to be noted that, in the following description, the 52 cards composing a deck are identified by respectively 52 identification numbers X, which are 52 numbers different from each other. The 52 identification numbers have the following typical values:

101, 102, 103, . . . , and 113 identify diamond 1, diamond 2, diamond 3, . . . , and diamond 13 respectively;

114, 115, 116, . . . , and 126 identify heart 1, heart 2, heart 3, . . . , and heart 13 respectively;

127, 128, 129, . . . , and 139 identify clover 1, clover 2, clover 3, . . . , and clover 13 respectively; and 140, 141, 142, . . . , and 152 identify spade 1, spade 2, spade 3, . . . , and spade 13 respectively.

As shown in the flowchart of FIG. 15, at the first step S10 (prime-number-setting step or prime-number-setting means), a common prime number w shared by the client apparatus 20A and 20B is set. Set typically by the server control means 1004 employed in the server apparatus 10, the prime number w is a natural number satisfying a condition of 1<X<w.

Then, at the next step S12 (random-number-setting step or random-number-setting means), the client control means 2004 employed in the client apparatus 20A and the client control means 2004 employed in the client apparatus 20B generate random numbers a1 and a2 respectively as their own random numbers. The random numbers a1 and a2 are kept confidentially in the client apparatus 20A and 20B respectively.

Subsequently, at the next step S14 (first-table-setting step or first-table-setting means), the client apparatus 20A creates the first table 2010.

To put it in detail, the client control means 2004 employed in the client apparatus 20A generates for each identification number X first data $Ua = X^a \pmod{w}$ from the prime number w and its own random number a1 generated by itself. It is to be noted that notation $U_a = X^a \pmod{w}$ means that the first data $U_a$ is a remainder obtained as a result of division of $X^a$ by the prime number w.

As shown in FIG. 16A, the first table 2010 is a table showing a list of the set identification numbers X (X1, X2, X3 and so on) associated with the generated pieces of first data Ua (Ua1, Ua2, Ua3 and so on) respectively in a tabular format. The first table 2010 is stored in the client storage means 2008.

Then, by the same token, at the next step S16 (first-table-creating step or first-table-creating means) the client apparatus 20B creates the first table 2010.

To put it in detail, the client control means 2004 employed in the client apparatus 20B generates for each identification number X first data $Ub = X^b \pmod{w}$ from the prime number w and its own random number a2 generated by itself. It is to be noted that notation $Ub = X^b \pmod{w}$ means that the first data Ub is a remainder obtained as a result of division of $X^b$ by the prime number w.

As shown in FIG. 16B, the first table 2010 is a table showing a list of the set identification numbers X (X1, X2, X3 and so on) associated with the generated pieces of first data Ub (Ub1, Ub2, Ub3 and so on) respectively in a tabular format. The first table 2010 is stored in the client storage means 2008.

Subsequently, at the next step S18 (first-data-transmitting step or first-data-transmitting means), the client apparatus 20A randomly transmits all the pieces of first data Ua included in the first table 2010 to the client apparatus 20B.

Then, at the next step S20 (second-table-creating step or second-table-creating means), the client apparatus 20B creates the second table 2012 shown in FIG. 17B from the first data Ua received from the client apparatus 20A.

To put it in detail, the client apparatus 20B generates second data $Va = Ua^b \pmod{w}$ from the prime number w, the random number a2 and a piece of first data Ua for each piece of first data Ua. It is to be noted that notation $Va = Ua^b \pmod{w}$ means that the second data Va is a remainder obtained as a result of division of $Ua^b$ by the prime number w.

As shown in FIG. 17B, the second table 2012 is a table showing a list of the first data Ua (Ua1, Ua2, Ua3 and so on) associated with the second data Va (Va1, Va2, Va3 and so on) respectively in a tabular format. The second table 2012 is stored in the client storage means 2008.

The first data Ua1 is associated with the second data Va1 for each identification number X.

Furthermore, at the same step S20 (second-data-transmitting step or second-data-transmitting means), the client apparatus 20B also randomly transmits all the pieces of second data Va included in the second table 2012 to the client apparatus 20A.

It is to be noted that the client apparatus 20B randomly transmits the pieces of second data Va to the client apparatus 20A for the following reason.

At the step S18, the client apparatus 20A randomly transmits the pieces of first data Ua associated with the identification numbers X to the client apparatus 20B. If the client apparatus 20B transmits the pieces of second data Va to the client apparatus 20A in the same order the client apparatus 20B receives the pieces of first data Ua from the client apparatus 20A at the step S18, there will be raised a problem that the client apparatus 20A is capable of recognizing a relation associating the identification numbers X with the pieces of second data Va so that the client apparatus 20A is inevitably capable of recognizing the number and the pattern of a card from the second data Va. For the purpose of solving this problem, the client apparatus 20B randomly transmits the pieces of second data Va to the client apparatus 20A.

Programs composing software for carrying out the series of pieces of processing described in this specification can be executed by a computer incorporated in dedicated hardware or executed by a general-purpose personal computer capable of implementing a variety of functions by execution of a variety of programs. The programs can be installed into such computers by downloading the programs from a network or reading the programs from a recording medium embedded in the computers. Examples of the recording medium are a CD-ROM (Compact Disk Read-Only Memory) and a DVD (Digital Versatile Disk).

Subsequently, at the next step S22 (first-data-transmitting step or first-data-transmitting means), the client apparatus 20B randomly transmits all the pieces of first data Ub included in the first table 2010 to the client apparatus 20A.

Then, at the next step S24 (second-table-creating step or second-table-creating means), the client apparatus 20A creates the second table 2012 shown in FIG. 17A from the first data Ub received from the client apparatus 20B.

To put it in detail, the client apparatus 20A generates second data $Vb = Ub^{a1} \pmod{w}$ from the prime number w, the random number a1 and a piece of first data Ub for each piece of first data Ub. It is to be noted that notation $Vb = Ub^{a1} \pmod{w}$ means that the second data Vb is a remainder obtained as a result of division of $Ub^{a1}$ by the prime number w.

As shown in FIG. 17A, the second table 2012 is a table showing a list of the first data Ub (Ub1, Ub2, Ub3 and so on) associated with the second data Vb (Vb1, Vb2, Vb3 and so on) respectively in a tabular format. The second table 2012 is stored in the client storage means 2008.

The first data Ub is associated with the second data Vb for each identification number X.

Furthermore, at the same step S24 (second-data-transmitting step or second-data-transmitting means), the client apparatus 20A also randomly transmits all the pieces of second data Vb included in the second table 2012 to the client apparatus 20B.

It is to be noted that the client apparatus 20A randomly transmits the pieces of second data Vb to the client apparatus 20B for the following reason.

At the step S22, the client apparatus 20B randomly transmits the pieces of first data Ub associated with the identification numbers X to the client apparatus 20A. If the client apparatus 20A transmits the pieces of second data Vb to the client apparatus 20B in the same order the client apparatus 20A receives the pieces of first data Ub from the client apparatus 20B at the step S22, there will be raised a problem that the client apparatus 20B is capable of recognizing a relation associating the identification numbers X with the pieces of second data Vb so that the client apparatus 20B is inevitably capable of recognizing the number and the pattern of a card from the second data Vb. For the purpose of solving this problem, the client apparatus 20A randomly transmits the pieces of second data Vb to the client apparatus 20B.

As described above, pieces of second data Va are included in the second table 2012, being associated with their respective identification numbers X. By the same token, pieces of second data Vb are included in the second table 2012, being associated with their respective identification numbers X. A piece of second data Va associated with any particular identification number X is equal to a piece of second data Vb associated with the same particular identification number X.

The reason why a piece of second data Va associated with any particular identification number X is equal to a piece of second data Vb associated with the same particular identification number X is the fact that the prime numbers w, the random numbers a1 and a2, the first data Ua and Ub as well as the second data Va and Vb are computed in accordance with the principle of Diffie-Hellman's common-key delivery method which is commonly known. The following equations are used for the explanation:

$$Ua = X^a \pmod{w} \quad (16)$$

$$Ub = X^b \pmod{w} \quad (17)$$

$$Vb = Ub^b \pmod{w} \quad (18)$$

$$Va = Ua^b \pmod{w} \quad (19)$$

Substituting Eq. (16) for Ua in Eq. (19) yields the following:

$$Va = Ua^b \pmod{w} = X^{ab} \pmod{w} \quad (20)$$

Substituting Eq. (17) for Ub in Eq. (18) yields the following:

$$Vb = Ub^b \pmod{w} = X^{ba} \pmod{w} \quad (21)$$

That is, Va=Vb.

Thus, by recognizing an identification number X, a card's number and pattern can be identified, allowing the game to be played on the basis of the identification numbers X.

Then, at the next step S26, the client apparatus 20A and 20B transmit the second data Vb and the second data Va respectively from the second table 2012 to the server apparatus 10.

Subsequently, at the next step S28 (third-table-creating step or third-table-creating means), the server apparatus 10 creates the third table 1010 showing pairs each consisting of a received piece of second data Va and a received piece of second data Vb, storing the third table 1010 in the server storage means 1008.

The third table 1010 is a list of pieces of second data Va and a list of pieces second data Vb each arranged in a random order. The contents of the third table 1010 can be verified by the client apparatus 20A and 20B.

At this point, the preparation for the game is completed.

The poker game is played as follows.

First of all, player A or the player using the client apparatus 20A draws a card from the third table 1010, that is, the player selects a piece of second data Va at a step S30 (distribution step or distribution means).

Assume that the selected piece of second data Va is Va1. In this case, the piece of second data Va1 is transmitted from the client apparatus 20A to the client apparatus 20B by way of the server apparatus 10, and server apparatus 10 deletes a pair of the piece of second data Va1 and the piece of second data Vb1 from the third table 1010 at the next step S32 (distribution step or distribution means).

Then, at the next step S34 (distribution step or distribution means), the client apparatus 20B reads out a piece of first data Ua1 associated with the piece of second data Va1 from the second table 2012 stored in the client storage means 2008 of the client apparatus 20B.

Subsequently, at the next step S36 (identification-number-identifying step or identification-number-identifying means), the client apparatus 20A reads out an identification number X associated with a piece of first data Ua1 from the first table 2010 stored in the client storage means 2008 of the client apparatus 20A.

Then, at the next step S38, the client control means 2004 employed in the client apparatus 20A displays the picture of a card having a number and a pattern, which are associated with the identification number X read out from the client storage means 2008, on the display unit of the client input/output means 2006.

Then, at the next step S40 (distribution step or distribution means), player B or the player using the client apparatus 20B draws a card from the third table 1010, that is, the player selects a piece of second data Vb.

Assume that the selected piece of second data Vb is Vb7. In this case, the piece of second data Vb7 is transmitted from the client apparatus 20B to the client apparatus 20A by way of the server apparatus 10, and server apparatus 10 deletes a pair of the piece of second data Va7 and the piece of second data Vb7 from the third table 1010 at the next step S42 (distribution step or distribution means).

Then, at the next step S44 (distribution step or distribution means), the client apparatus 20A reads out a piece of first data Ub7 associated with the piece of second data Vb7 from the second table 2012 stored in the client storage means 2008 of the client apparatus 20A and transmits the piece of first data Ub7 to the client apparatus 20B.

Subsequently, at the next step S46 (identification-number-identifying step or identification-number-identifying means), the client apparatus 20B reads out an identification number X associated with a piece of first data Ub7 from the first table 2010 stored in the client storage means 2008 of the client apparatus 20B.

Then, at the next step S48, the client control means 2004 employed in the client apparatus 20B displays the picture of a card having a number and a pattern, which are associated with the identification number X read out from the client storage means 2008, on the display unit of the client input/output means 2006.

Subsequently, the flow of the processing goes on to a step S50 to form a judgment as to whether or not a predetermined number of cards has been distributed to each of the players. The number of distributed cards is typically 5. If the predetermined number of cards has not been distributed to each of the players, the flow of the processing goes back to the step S30 to repeat the same operations. If the predetermined number of cards has been distributed to each of the players, on the other hand, the flow of the processing goes on to a step S52 at which the strength of a combination of the cards held by the player using the client apparatus 20A is compared with the strength of a combination of the cards held by the player using the client apparatus 20B. Then, the winner of the game is determined to end the game.

As described above, in accordance with this embodiment, each player receives a piece of second data V from the third table 1010 without knowing the value of the data in advance. At the same time, the piece of second data V is deleted from the third table 1010. These operations are equivalent to an operation carried out by the player to draw a card from the card deck. At that time, the card's number and pattern, which are associated with the piece of second data V, are not revealed to the players.

Thus, it is possible to reliably prevent a card's number and pattern as well as the cards of the deck from being falsified or forged in such a card game. As a result, there is provided an advantage that a cheating can be avoided in playing the game as a kind of gambling.

In this embodiment, only 2 client apparatus are used as described above. It is to be noted, however, that the present invention's communication game system and communication game method can also be applied to cases in which 3 or more client apparatus are used. For example, N client apparatus are used. In this case, first to Nth data is generated for each of the N players, sequentially one player after another, by adopting the same calculation method. The Nth data associated with an identification number is univocally determined.

In addition, in this embodiment, the game played by using the present invention's communication game system and communication game method is a poker game by using cards. However, the present invention can also be applied to a variety of other card games.

By virtue of the communication game system and the communication game method, which are provided by the present invention as described above, players playing a game can be prevented from doing a cheating so that the system and the method are advantageous in playing the game as a kind of gambling.

While a preferred embodiment of the present invention has been described using specific terms, such description is for illustrative purposes only, and it is to be understood that changes and variations may be made without departing from the spirit or scope of the following claims.

What is claimed is:

1. An information-processing system comprising:
  an information-processing client apparatus and an information management apparatus connected to said information-processing client apparatus by a communication network wherein
  said information-processing client apparatus having connected thereto:
    individual authentication means for authenticating a person operating said information-processing client apparatus and for generating game data, said individual authentication means including (a) a fingerprint sensing means for sensing a fingerprint and outputting fingerprint data in gray scale, (b) a fingerprint collation means for generating template data of a characteristic portion of the fingerprint from the fingerprint data, (c) a memory means for storing the template data and chip data to be given in exchange for stake data, (d) an elemental-information-generating means for generating elemental information in accordance with a predetermined condition, and (e) an authentication-information-generating means for irreversibly generating authentication-information on the basis of said elemental information generated by said elemental-information-generating means,
  said information management apparatus comprises:
    an authentication-information-receiving means for receiving a plurality of pieces of said authentication information from said information-processing client apparatus; and
    an authentication-information transmitting means for transmitting said pieces of said authentication information, received by said authentication-information-receiving means, back to said information-processing client apparatus,
  wherein said information-processing client apparatus including an elemental-information-transmitting means for transmitting said elemental information generated by said elemental-information-generating means to said information management apparatus after reception of all said pieces of said authentication information from said information management apparatus.

2. The information-processing system according to claim 1, wherein the chip data includes a digital signature of a service-providing company.

3. The information-processing system according to claim 1, wherein said authentication information includes a digital signature and a time stamp.

4. The information-processing system according to claim 1, wherein said individual authentication apparatus is connected to said information-processing client apparatus after fingerprint data is registered therein in advance.

5. An information-processing client apparatus connected to an information management apparatus by a communication network for connecting said information management apparatus to a plurality of other information-processing client apparatuses, said information-processing client apparatus comprising:
  individual authentication means, connected to said information-processing client apparatus, for authenticating a person registered in advance and for generating game data, said individual authentication means including (a) a fingerprint sensing means for sensing a fingerprint and outputting fingerprint data in gray scale, (b) a fingerprint collation means for generating template data of a characteristic portion of the fingerprint from the fingerprint data, (c) a memory means for storing the template data and chip data to be given in exchange for stake data (d) an elemental-information-generating means for generating elemental information in accordance with a predetermined condition, and (e) an authentication-information-generating means for irreversibly generating authentication-information on the basis of said elemental information generated by said elemental-information-generating means; and
  an elemental-information-transmitting means for transmitting said elemental information generated by said elemental-information-generating means to said information management apparatus after reception of all said pieces of said authentication information, which are associated with pieces of elemental information generated by the other ones of said information-processing client apparatuses, from said information management apparatus.

6. An information-processing client apparatus according to claim 5, said information-processing client apparatus further comprising:
  an elemental-information-receiving means for receiving said elemental information generated by the other ones of said information-processing client apparatuses from said other information-processing client apparatuses; and a judgment means for forming a judgment as to whether or not said elemental information received by said elemental-information-receiving means has been changed on the basis of said authentication information generated by said authentication-information-generating means.

7. An information-processing client apparatus according to claim 5,
wherein said elemental-information-generating means generates a plurality of prime numbers as said elemental information; and
wherein said authentication-information-generating means generates a composite number equal to a product of said prime numbers generated by said elemental-information-generating means as said authentication information.

8. An information-processing client apparatus according to claim 5,
wherein information is exchanged with said information management apparatus, which exchanges information with said information-processing client apparatuses, by adopting a public-key encryption technique; and
wherein said elemental-information-generating means generates said prime numbers in a process of generating a public key and a secret key by adoption of said public-key encryption technique.

9. An information-processing client apparatus according to claim 5,
wherein said elemental-information-transmitting means transmits said elemental information generated by said elemental-information-generating means to said information management apparatus after all said pieces of said authentication information for all pieces of said elemental information generated by the other ones of said information-processing client apparatuses are received from said information management apparatus.

10. An information-processing client apparatus according to claim 5,
wherein said authentication-information-generating means generates hash data of said elemental information as said authentication information.

11. The information-processing client apparatus according to claim 5, wherein the chip data includes a digital signature of a service-providing company.

12. The information-processing client apparatus according to claim 5, wherein said authentication information includes a digital signature and a time stamp.

13. The information-processing client apparatus according to claim 5, wherein said individual authentication apparatus is connected to said information-processing client apparatus after fingerprint data is registered therein in advance.

14. An information-processing method adopted in an information-processing system comprising an information management apparatus connected to a plurality of information-processing player apparatuses by a communication network, each said information-processing player apparatus connected to an individual authentication apparatus, said information-processing method comprising:
an individual authentication step of authenticating at each individual authentication apparatus a person registered in advance, said individual authentication step including a fingerprint sensing step of sensing a fingerprint and outputting fingerprint data in gray scale, a fingerprint collation step of generating template data of a characteristic portion of the fingerprint from the fingerprint data, and a memory step of storing the template data and chip data to be given in exchange for stake data;
an elemental-information-generating step of generating elemental information in said individual authentication apparatus in accordance with a predetermined condition;
an authentication-information-generating step of irreversibly generating authentication-information in said individual authentication apparatus on the basis of said elemental information generated at said elemental-information-generating step;
an authentication-information-receiving step of receiving a plurality of pieces of said authentication information in said information management apparatus from said information-processing player apparatuses;
an authentication-information-transmitting step of transmitting said pieces of said authentication information received at said authentication-information-receiving step from said information management apparatus back to said information-processing player apparatuses; and
an elemental-information-transmitting step of transmitting said elemental information generated at said elemental-information-generating step from said information-processing player apparatus to said information management apparatus after reception of all said pieces of said authentication information by said information-processing player apparatus from said information management apparatus.

15. The information-processing method according to claim 14, wherein the chip data includes a digital signature of a service-providing company.

16. The information-processing method according to claim 14, wherein said authentication information includes a digital signature and a time stamp.

17. The information-processing method according to claim 14, wherein said individual authentication apparatus is connected to said information-processing client apparatus after fingerprint data is registered therein in advance.

18. An information-processing method adopted in an information-processing apparatus connected to an information management apparatus by a communication network for connecting said information management apparatus to a plurality of other information-processing client apparatuses, each said information-processing client apparatus connected to an individual authentication apparatus, said information-processing method comprising:
an individual authentication step of authenticating at each individual authentication apparatus a person registered in advance, said individual authentication step including a fingerprint sensing step of sensing a fingerprint and outputting fingerprint data in gray scale, a fingerprint collation step of generating template data of a characteristic portion of the fingerprint from the fingerprint data, and a memory step of storing the template data and chip data to be given in exchange for stake data;
an elemental-information-generating step of generating elemental information in accordance with a predetermined condition at each individual authentication apparatus;
an authentication-information-generating step of, at each individual authentication apparatus, irreversibly generating authentication-information on the basis of said elemental information generated at said elemental-information-generating step; and
an elemental-information-transmitting step of transmitting said elemental information generated at said elemental-information-generating step to said information management apparatus after reception of all said pieces of said authentication information, which are associated with pieces of elemental information generated by the other ones of said information-processing client apparatuses, from said information management apparatus.

19. The information-processing method according to claim 18, wherein the chip data includes a digital signature of a service-providing company.

20. The information-processing method according to claim 18, wherein said authentication information includes a digital signature and a time stamp.

21. The information-processing method according to claim 18, wherein said individual authentication apparatus is connected to said information-processing client apparatus after fingerprint data is registered therein in advance.

22. A computer recording medium, carrying an information-processing program, that when executed by a computer, causes the computer to carry out a process for controlling an individual authentication apparatus and an information-processing player apparatus, said information-processing player apparatus connected to an information management apparatus by a communication network for connecting said information management apparatus to a plurality of other information-processing player apparatuses, said process comprising:

an individual authentication step of authenticating at each individual authentication apparatus a person registered in advance, said individual authentication step including a fingerprint sensing step of sensing a fingerprint and outputting fingerprint data in gray scale, a fingerprint collation step of generating template data of a characteristic portion of the fingerprint from the fingerprint data, and a memory step of storing the template data and chip data to be given in exchange for stake data;

an elemental-information-generating step of generating elemental information in accordance with a predetermined condition at each individual authentication apparatus;

an authentication-information-generating step of, at each individual authentication apparatus, irreversibly generating authentication information on the basis of said elemental information generated at said elemental-information-generating step; and an elemental-information-transmitting step of transmitting said elemental information generated at said elemental-information-generating step to said information management apparatus after reception of all said pieces of said authentication information, which are associated with pieces of elemental information generated by the other ones of said information-processing player apparatuses, from said information management apparatus.

23. The computer recording medium according to claim 22, wherein the chip data includes a digital signature of a service-providing company.

24. The computer recording medium according to claim 22, wherein said authentication information includes a digital signature and a time stamp.

25. The computer recording medium according to claim 22, wherein said individual authentication apparatus is connected to said information-processing client apparatus after fingerprint data is registered therein in advance.

* * * * *